(12) United States Patent
Brandt et al.

(10) Patent No.: US 7,298,275 B2
(45) Date of Patent: Nov. 20, 2007

(54) MACHINE ASSOCIATING METHOD AND APPARATUS

(75) Inventors: David D. Brandt, Milwaukee, WI (US); David W. Farchmin, Grafton, WI (US); Ramdas M. Pai, Racine, WI (US); Thong Nguyen, Shorewood, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 624 days.

(21) Appl. No.: 10/256,699

(22) Filed: Sep. 27, 2002

(65) Prior Publication Data
US 2004/0203874 A1 Oct. 14, 2004

(51) Int. Cl.
*G08B 23/00* (2006.01)
*B60T 7/12* (2006.01)
*G05D 1/00* (2006.01)
*G06F 7/00* (2006.01)
*G06F 17/00* (2006.01)

(52) U.S. Cl. ............... 340/573.1; 701/79; 701/200; 702/188; 705/6

(58) Field of Classification Search .............. 455/456; 702/188; 705/6; 701/200, 79; 340/537.1, 340/573.1; 700/79
See application file for complete search history.

(56) References Cited

U.S. PATENT DOCUMENTS

| | | |
|---|---|---|
| 3,812,947 A | 5/1974 | Nygaard |
| 4,309,600 A | 1/1982 | Perry et al. |
| 4,518,958 A | 5/1985 | Cook et al. |
| 4,598,275 A | 7/1986 | Ross et al. |
| 4,612,620 A | 9/1986 | Davis et al. |
| 4,700,197 A | 10/1987 | Milne |
| 4,728,959 A | 3/1988 | Maloney et al. |
| 4,742,470 A | 5/1988 | Juengel |
| 4,803,039 A | 2/1989 | Impink, Jr. et al. |
| 5,119,104 A | 6/1992 | Heller |
| 5,119,401 A | 6/1992 | Tsujimoto |
| 5,121,331 A | 6/1992 | Lovrenich |

(Continued)

FOREIGN PATENT DOCUMENTS

DE 39 32 375 A1 9/1988

(Continued)

OTHER PUBLICATIONS

A Statistical Modeling Approach to Location Estimation; IEEE Transactions on Mobile Computing; vol. 1, No. 1, Jan.-Mar. 2002; p. 59-69; Roos, et al.

(Continued)

*Primary Examiner*—William D. Cumming
(74) *Attorney, Agent, or Firm*—Quarles & Brady LLP; William R. Walbrun

(57) ABSTRACT

A method for identifying a machine from within a facility for which information is to be presented via a wireless information device (WID), the method including the steps of assigning machine identifiers to each facility machine, determining WID location within the facility, presenting machine identifiers corresponding to machines associated with the WID location to the WID user, receiving a selection indication via the WID indicating one of the visually presented machine identifiers, accessing machine information corresponding to the selected machine identifier, transmitting the accessed machine information to the WID and presenting the accessed machine information via the WID.

69 Claims, 19 Drawing Sheets

U.S. PATENT DOCUMENTS

| | | |
|---|---|---|
| 5,202,929 A | 4/1993 | Lemelson |
| 5,287,266 A | 2/1994 | Malec et al. |
| 5,347,463 A | 9/1994 | Nakamura |
| 5,432,702 A | 7/1995 | Barnett |
| 5,485,634 A | 1/1996 | Weiser et al. |
| 5,519,878 A | 5/1996 | Dolin, Jr. |
| 5,544,321 A | 8/1996 | Theimer et al. |
| 5,548,660 A | 8/1996 | Lemelson |
| 5,552,806 A | 9/1996 | Lenchik |
| 5,555,376 A | 9/1996 | Theimer et al. |
| 5,598,572 A | 1/1997 | Tanikoshi et al. |
| 5,627,549 A | 5/1997 | Park |
| 5,642,303 A | 6/1997 | Small et al. |
| 5,642,353 A | 6/1997 | Roy, III et al. |
| 5,649,300 A | 7/1997 | Snyder et al. |
| 5,689,094 A | 11/1997 | Friedli et al. |
| 5,751,221 A | 5/1998 | Stanfield et al. |
| 5,825,759 A | 10/1998 | Liu |
| 5,835,061 A | 11/1998 | Stewart |
| 5,907,491 A | 5/1999 | Canada et al. |
| 5,910,799 A | 6/1999 | Carpenter et al. |
| 5,956,465 A | 9/1999 | Takagi et al. |
| 5,960,085 A | 9/1999 | de la Huerga |
| 5,960,341 A | 9/1999 | LeBlanc et al. |
| 5,978,753 A | 11/1999 | Eidson |
| 5,991,284 A | 11/1999 | Willenegger et al. |
| 6,011,487 A | 1/2000 | Plocher |
| 6,026,304 A | 2/2000 | Hilsenrath et al. |
| 6,060,993 A | 5/2000 | Cohen |
| 6,157,368 A | 12/2000 | Fager |
| 6,167,464 A | 12/2000 | Kretschmann |
| 6,211,799 B1 | 4/2001 | Post et al. |
| 6,236,335 B1 | 5/2001 | Goodwin, III |
| 6,252,867 B1 | 6/2001 | Pfeil et al. |
| 6,282,455 B1 | 8/2001 | Engdahl |
| 6,314,337 B1 | 11/2001 | Marcum |
| 6,321,092 B1 | 11/2001 | Fitch et al. |
| 6,347,229 B1 | 2/2002 | Zelmanovich et al. |
| 6,359,711 B1 | 3/2002 | Cole et al. |
| 6,362,783 B1 | 3/2002 | Sugiura et al. |
| 6,381,502 B1 | 4/2002 | Rudder et al. |
| 6,407,719 B1 | 6/2002 | Ohira et al. |
| 6,418,352 B1 | 7/2002 | Ellis et al. |
| 6,437,740 B1 | 8/2002 | De Champlain et al. |
| 6,446,004 B1 | 9/2002 | Cao et al. |
| 6,453,168 B1 | 9/2002 | McCrady et al. |
| 6,453,210 B1 | 9/2002 | Belotserkovskiy et al. |
| 6,496,775 B2 | 12/2002 | McDonald, Jr. et al. |
| 6,507,762 B1 | 1/2003 | Amro et al. |
| 6,516,239 B1 | 2/2003 | Madden et al. |
| 6,546,304 B2 | 4/2003 | Thorvaldsson et al. |
| 6,574,549 B2 * | 6/2003 | Cato et al. ................... 701/200 |
| 6,600,418 B2 | 7/2003 | Francis et al. |
| 6,600,476 B2 | 7/2003 | Mathis et al. |
| 6,611,755 B1 | 8/2003 | Coffee et al. |
| 6,615,094 B2 | 9/2003 | Gleis |
| 6,694,211 B2 | 2/2004 | Hosel |
| 6,804,578 B1 | 10/2004 | Ghaffari |
| 6,813,608 B1 * | 11/2004 | Baranowski ................... 705/6 |
| 6,839,604 B2 | 1/2005 | Godfrey et al. |
| 6,895,301 B2 | 5/2005 | Mountz |
| 6,957,073 B2 | 10/2005 | Bye |
| 6,993,405 B2 | 1/2006 | Beaulieu et al. |
| 7,010,379 B2 | 3/2006 | Maske et al. |
| 7,069,100 B2 | 6/2006 | Monette et al. |
| 2001/0003443 A1 | 6/2001 | Velazquez et al. |
| 2001/0005178 A1 | 6/2001 | Stewart |
| 2001/0018349 A1 | 8/2001 | Kinnunen et al. |
| 2001/0021182 A1 | 9/2001 | Wakutsu |
| 2001/0024174 A1 | 9/2001 | Turner |
| 2002/0007407 A1 | 1/2002 | Klein |
| 2002/0008621 A1 | 1/2002 | Barritz et al. |
| 2002/0030094 A1 | 3/2002 | Curry et al. |
| 2002/0051430 A1 | 5/2002 | Kasami et al. |
| 2002/0058499 A1 | 5/2002 | Ortiz |
| 2002/0101375 A1 | 8/2002 | Stilp et al. |
| 2002/0102995 A1 | 8/2002 | Zelmanovich et al. |
| 2002/0118655 A1 | 8/2002 | Harrington et al. |
| 2002/0123325 A1 | 9/2002 | Cooper |
| 2002/0125886 A1 | 9/2002 | Bates et al. |
| 2002/0131446 A1 | 9/2002 | Metcalf, III |
| 2002/0161633 A1 | 10/2002 | Jacob et al. |
| 2002/0167417 A1 | 11/2002 | Welles, II et al. |
| 2002/0183979 A1 * | 12/2002 | Wildman .................... 702/188 |
| 2002/0193900 A1 | 12/2002 | Kinoshita et al. |
| 2003/0011467 A1 | 1/2003 | Suomela |
| 2003/0013456 A1 | 1/2003 | Bates et al. |
| 2003/0023882 A1 | 1/2003 | Udom |
| 2003/0061295 A1 | 3/2003 | Oberg et al. |
| 2003/0146835 A1 | 8/2003 | Carter |
| 2003/0191767 A1 | 10/2003 | Kabala |
| 2003/0197643 A1 | 10/2003 | Fullerton et al. |
| 2003/0234741 A1 | 12/2003 | Rogers et al. |
| 2004/0148039 A1 * | 7/2004 | Farchmin et al. ............. 700/79 |
| 2004/0192342 A1 | 9/2004 | Ranganathan |
| 2004/0203895 A1 | 10/2004 | Balasuriya |
| 2004/0203930 A1 | 10/2004 | Farchmin et al. |
| 2004/0235468 A1 | 11/2004 | Luebke et al. |
| 2004/0260518 A1 | 12/2004 | Polz et al. |
| 2005/0021158 A1 | 1/2005 | De Meyer et al. |
| 2005/0035862 A1 * | 2/2005 | Wildman et al. ........ 340/573.1 |
| 2005/0078297 A1 | 4/2005 | Doemens et al. |
| 2005/0096776 A1 | 5/2005 | Beaulieu et al. |

FOREIGN PATENT DOCUMENTS

| | | |
|---|---|---|
| DE | 38 32 375 A1 | 3/1990 |
| DE | 3832375 A1 | 3/1990 |
| DE | 20010529 U1 | 11/2000 |
| DE | 19955646 A1 | 6/2001 |
| DE | 101 42 279 | 3/2004 |
| EP | 0 472 874 A1 | 7/1991 |
| EP | 0 626 635 A2 | 11/1994 |
| EP | 0 992 921 A2 | 4/2000 |
| EP | 1 058 171 A2 | 12/2000 |
| EP | 1 233 315 A1 | 2/2001 |
| EP | 1 265 118 A1 | 6/2001 |
| EP | 1 138 451 A2 | 10/2001 |
| EP | 1 209 930 A2 | 5/2002 |
| EP | 0 801 342 B1 | 1/2003 |
| GB | 2 274 521 | 7/1994 |
| GB | 2 365 662 | 2/2002 |
| GB | 2 372 365 | 8/2002 |
| WO | WO 95/14938 | 6/1995 |
| WO | WO 96/23340 | 8/1996 |
| WO | WO 98/30045 | 7/1998 |
| WO | WO 99/28797 | 6/1999 |
| WO | WO 99/39219 | 8/1999 |
| WO | WO 00/17737 | 3/2000 |
| WO | WO 00/50919 | 8/2000 |
| WO | WO 01/16607 A2 | 3/2001 |
| WO | WO 01/22118 A2 | 3/2001 |
| WO | WO01/38897 | 5/2001 |
| WO | WO 01/41546 A2 | 6/2001 |
| WO | WO 01/82032 A2 | 11/2001 |
| WO | WO 02/05107 A1 | 1/2002 |
| WO | WO 02/12992 A2 | 2/2002 |
| WO | WO 02/13557 A1 | 2/2002 |
| WO | WO 02/30053 | 4/2002 |
| WO | WO 02/30053 A1 | 4/2002 |
| WO | WO 02/43428 A1 | 5/2002 |
| WO | WO 02/054813 A1 | 7/2002 |

WO    WO 02/056274 A1    7/2002

OTHER PUBLICATIONS

A Statistical Modeling Approach To Location Estimation; Master's Thesis, Univ. of Helsinki, Department of Computer Science, May 5, 2001, Teemu Tonteri.

An Indoors Wireless Positioning System Based On Wireless Local Area Network Infrastructure; SatNav 2003, 6th Intl. Symposium on Satellite Navation; Melbourne Australia; Wang et al; 13 pages; Jul. 22-25, 2003.

* cited by examiner

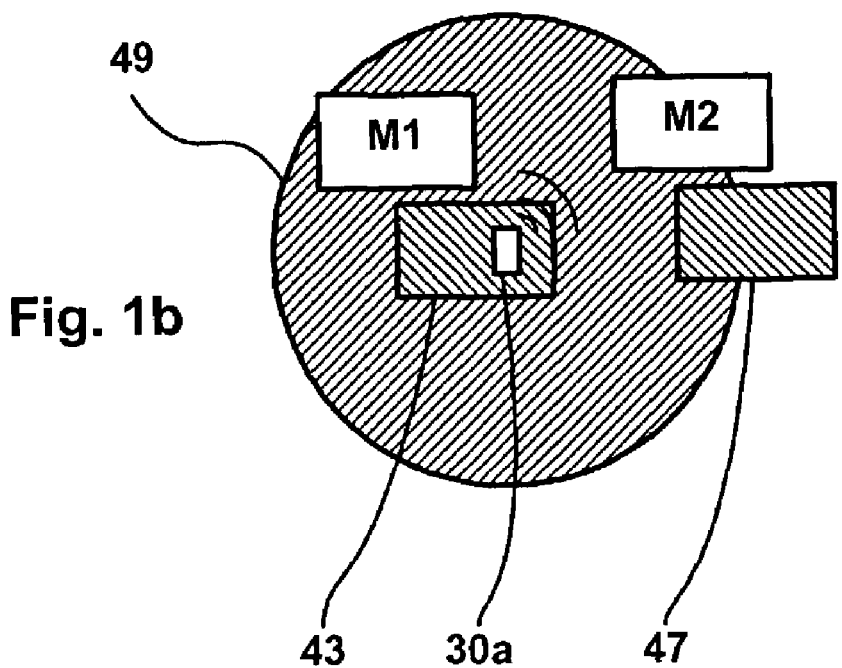
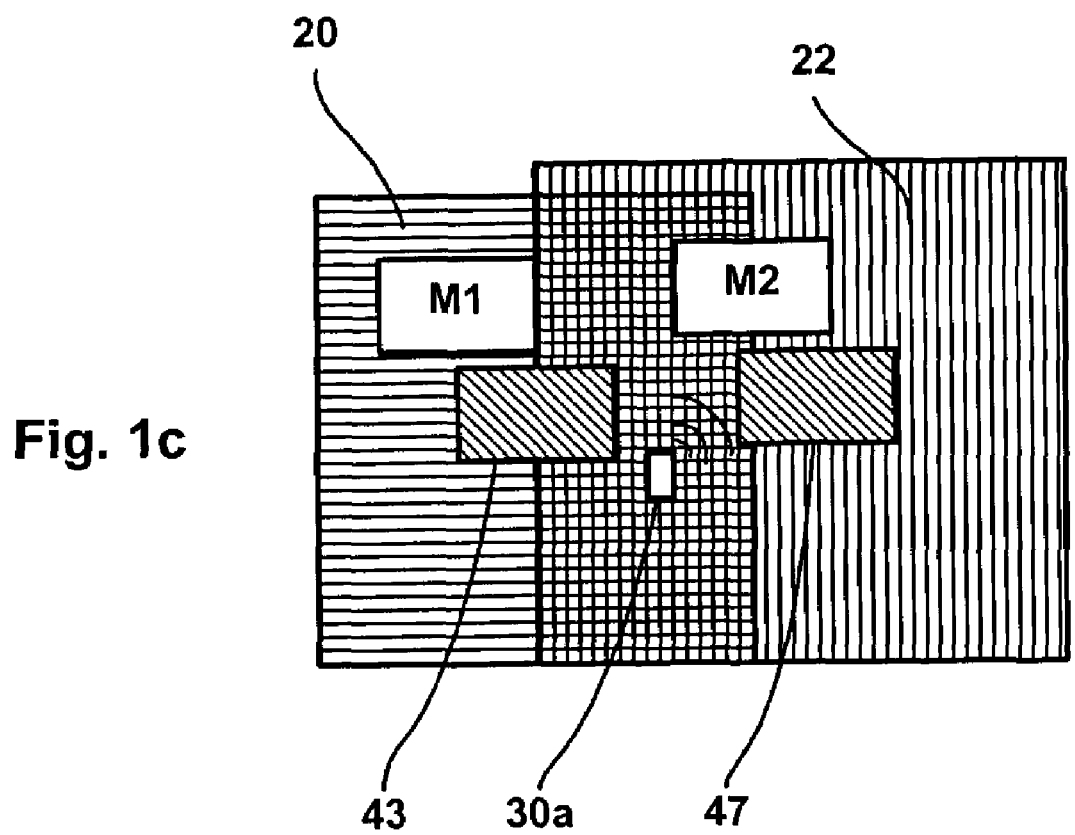

Authorization/Preferences Specification

| WID # | Machine # | Access Authority | Access Spec. | Control Authority | Control Spec. |
|---|---|---|---|---|---|
| 1 | M1 | Y-1 | Spec-1 | Y-4 | Spec-1 |
|   | M2 | Y-1 | Spec-3 | N | "LOA" |
|   | M3 | N | "LOA" | N | "LOA" |
|   | M4 | Y-2 | Spec-3 | Y-2 | Spec-3 |
|   | M5 | Y-2 | Spec-2 | N | "LOA" |
|   | M6 | N | "LOA" | N | "LOA" |
|   | M7 | Y-1 | Spec-4 | Y-5 | Spec-2 |
|   | M8 | Y-5 | Spec-1 | Y-4 | Spec-4 |
| ... |   |   |   |   |   |
|   | MNNN | Y-2 | Spec-5 | N | Spec-2 |
| 2 | M1 | Y-8 | Spec-1 | Y-1 | Spec-1 |
|   | M2 | Y-1 | Spec-2 | N | Spec-1 |
|   | M3 | N | "LOA" | N | "LOA" |
|   | M4 | N | "LOA" | N | "LOA" |
|   | M5 | N | "LOA" | N | "LOA" |
|   | M6 | N | "LOA" | N | "LOA" |
|   | M7 | Y-1 | Spec-3 | Y-5 | Spec-2 |
|   | M8 | Y-5 | Spec-4 | Y-4 | Spec-4 |
| ... |   |   |   |   |   |
|   | MNNN | N | "LOA | N | "LOA" |
| 3 | M1 | Y-1 | Spec-3 | Y-4 | Spec-1 |
|   | M2 | Y-1 | Spec-1 | N | Spec-1 |
| ... |   |   |   |   |   |
| XX... |   |   |   |   |   |

Fig. 3

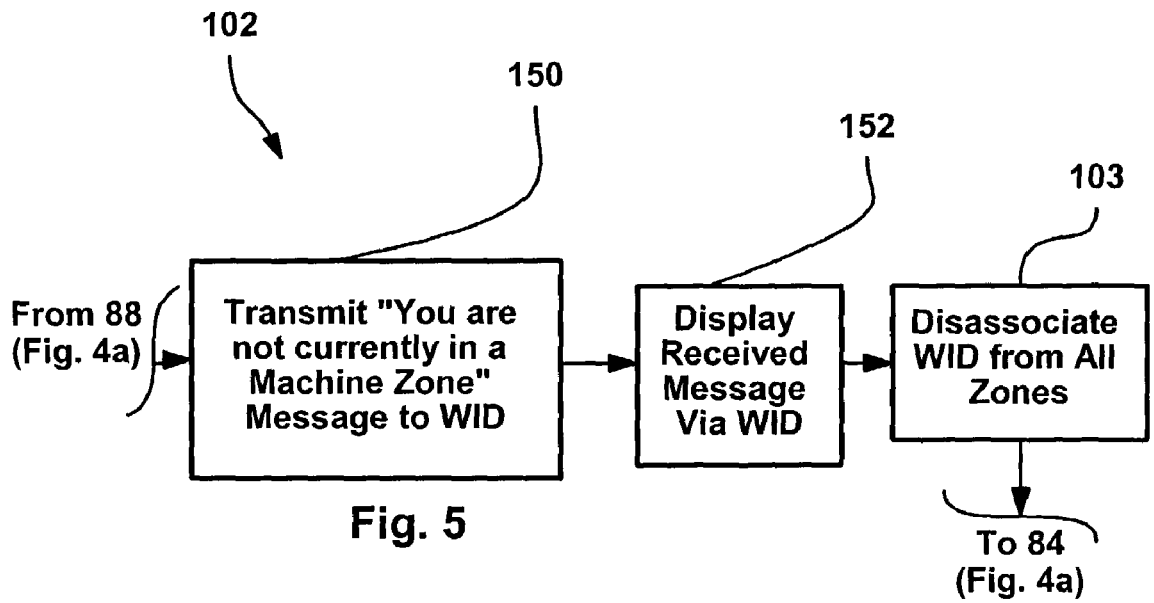
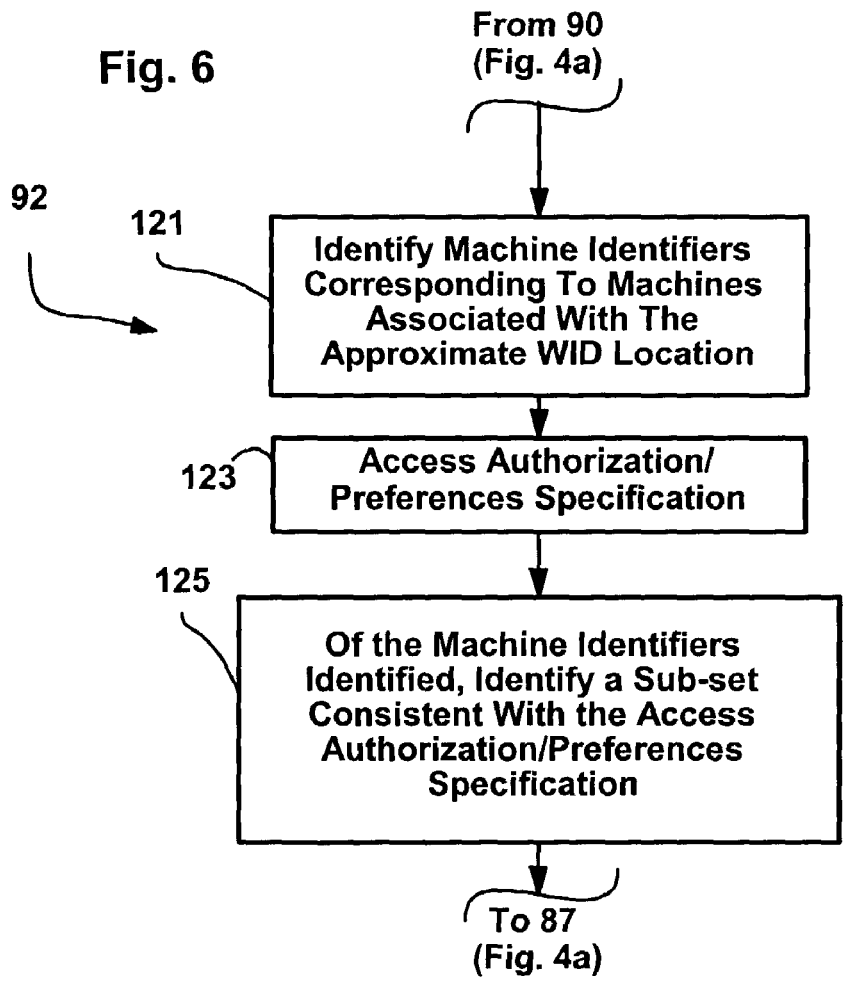

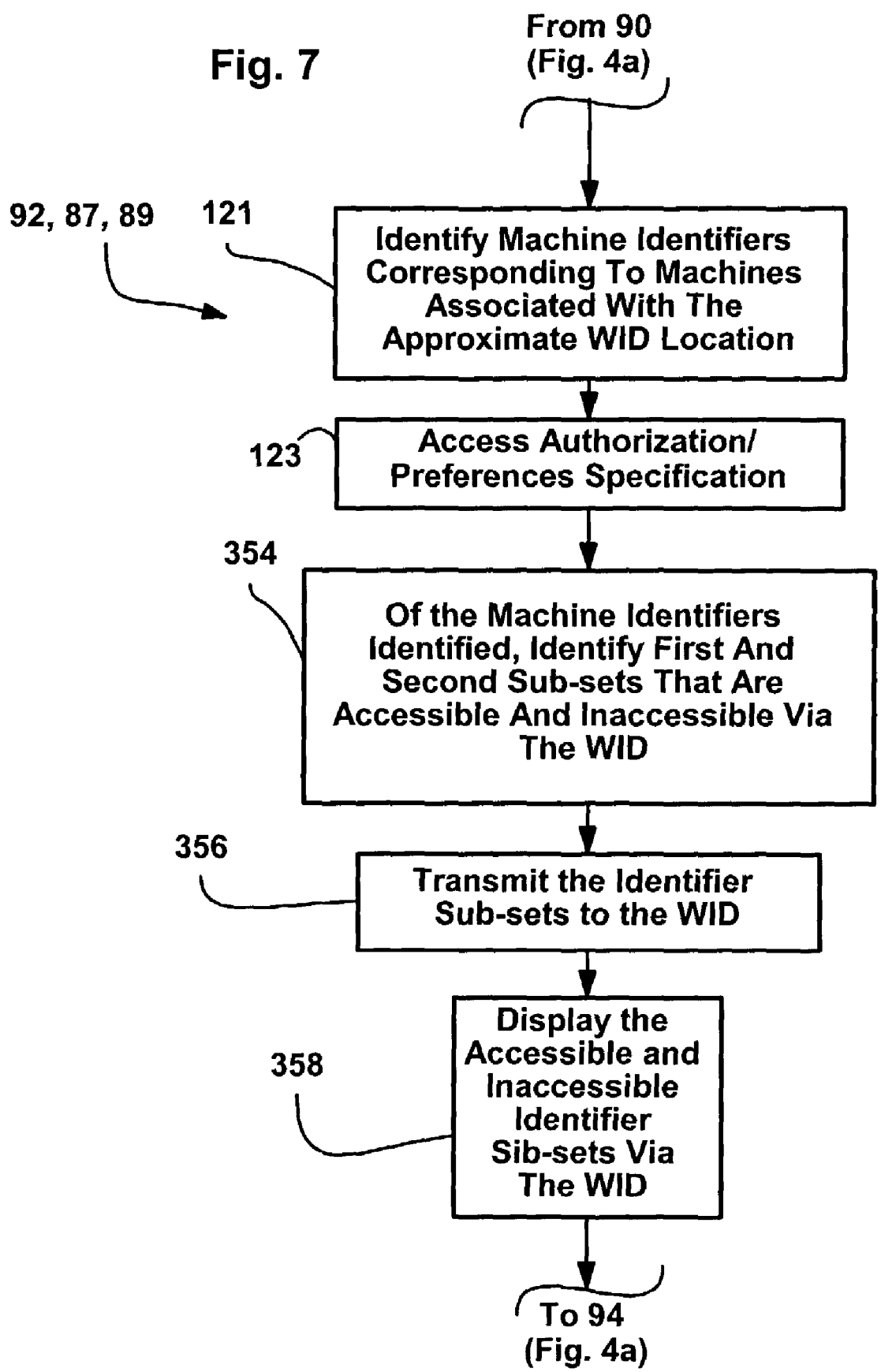

Fig. 8
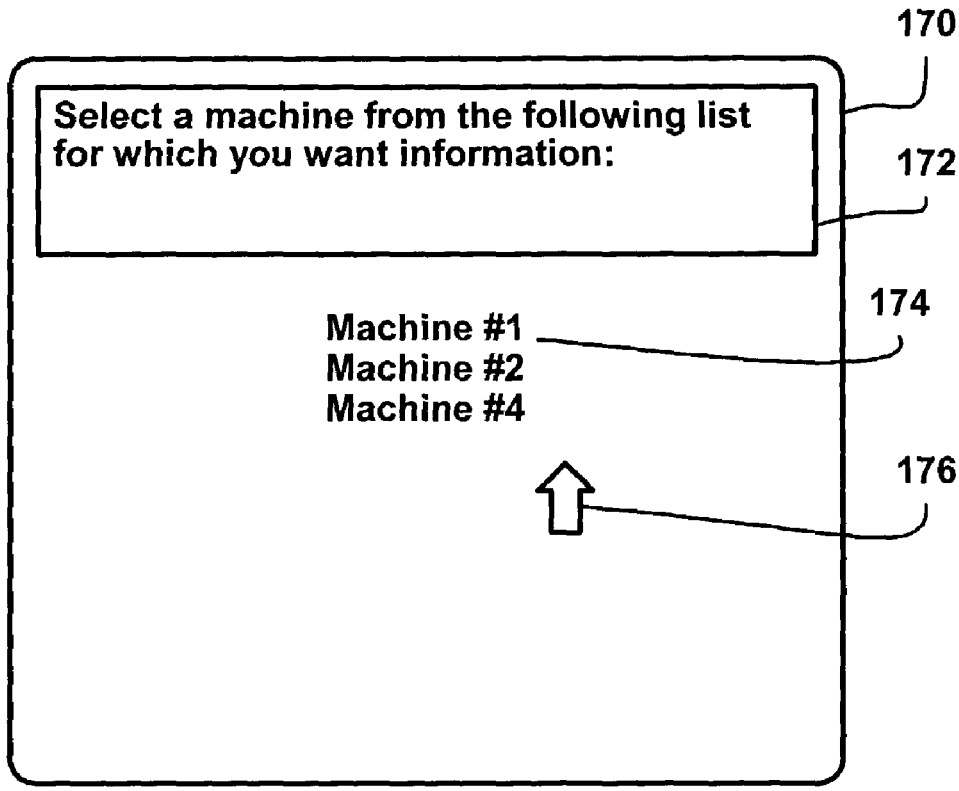
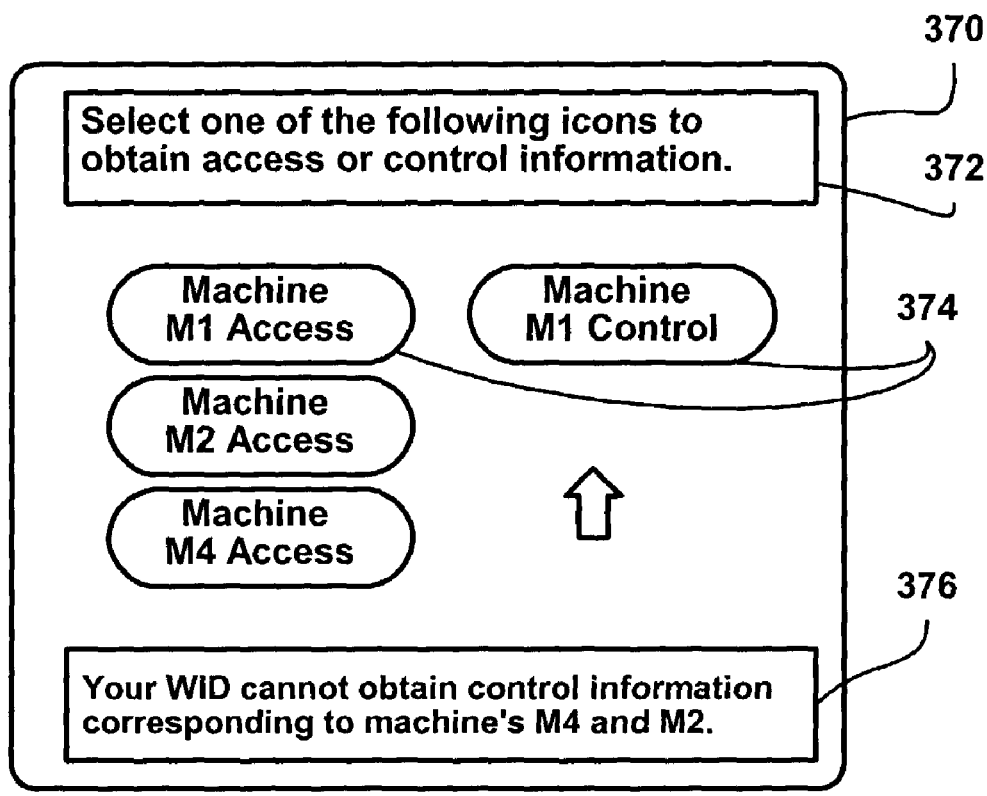
Fig. 9

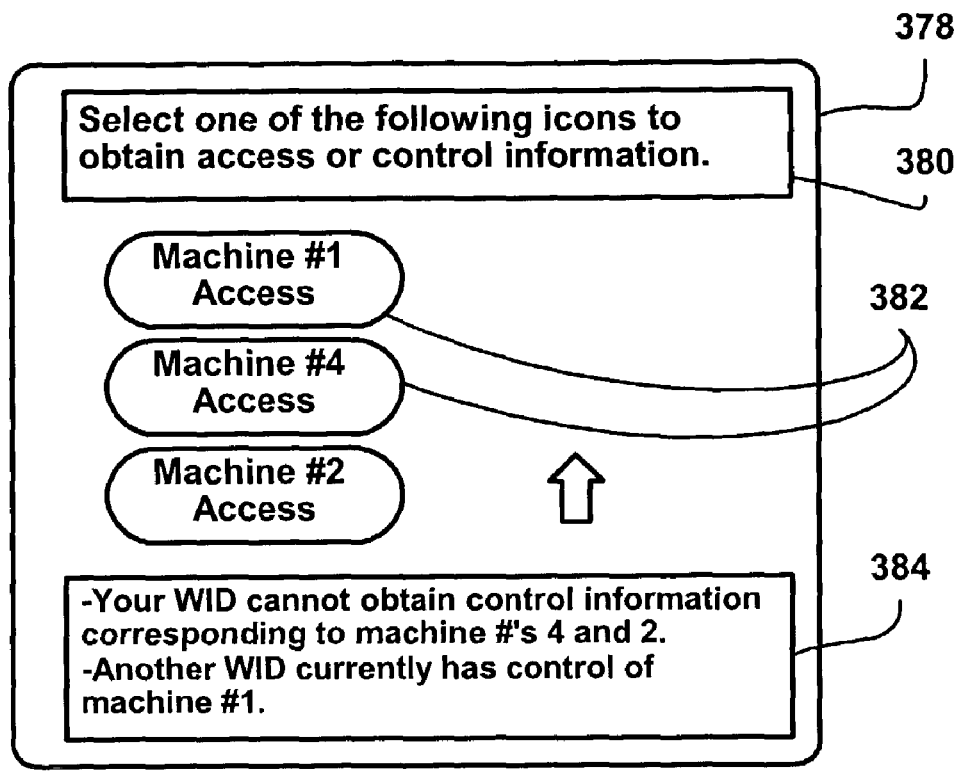
Fig. 11
Fig. 12
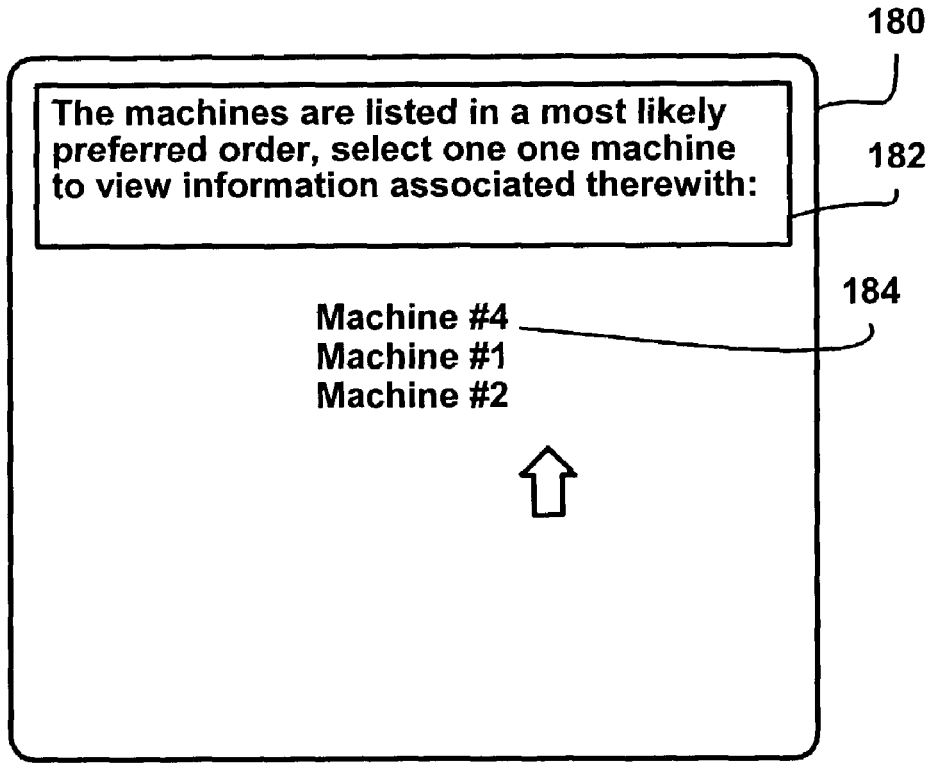

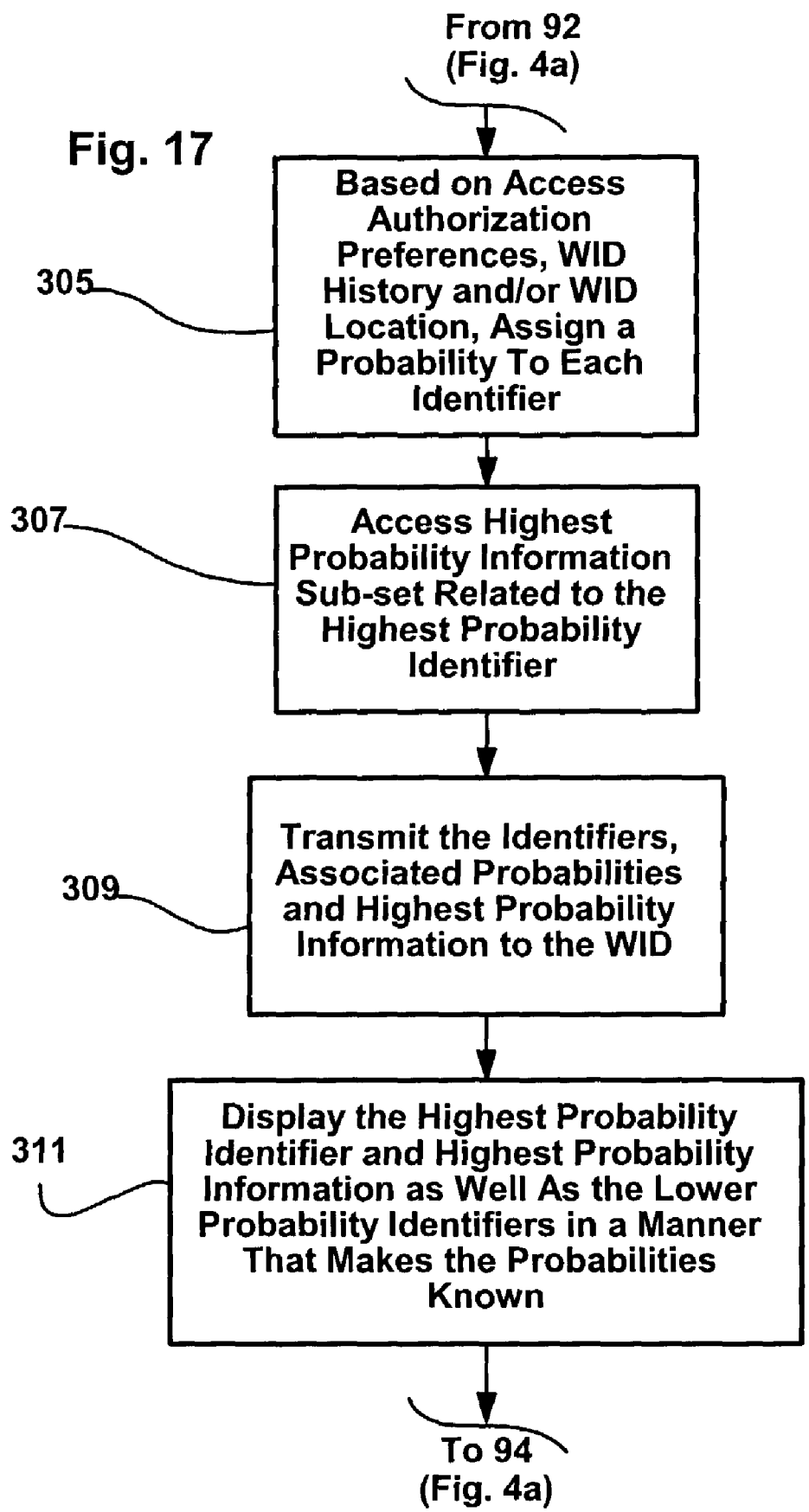

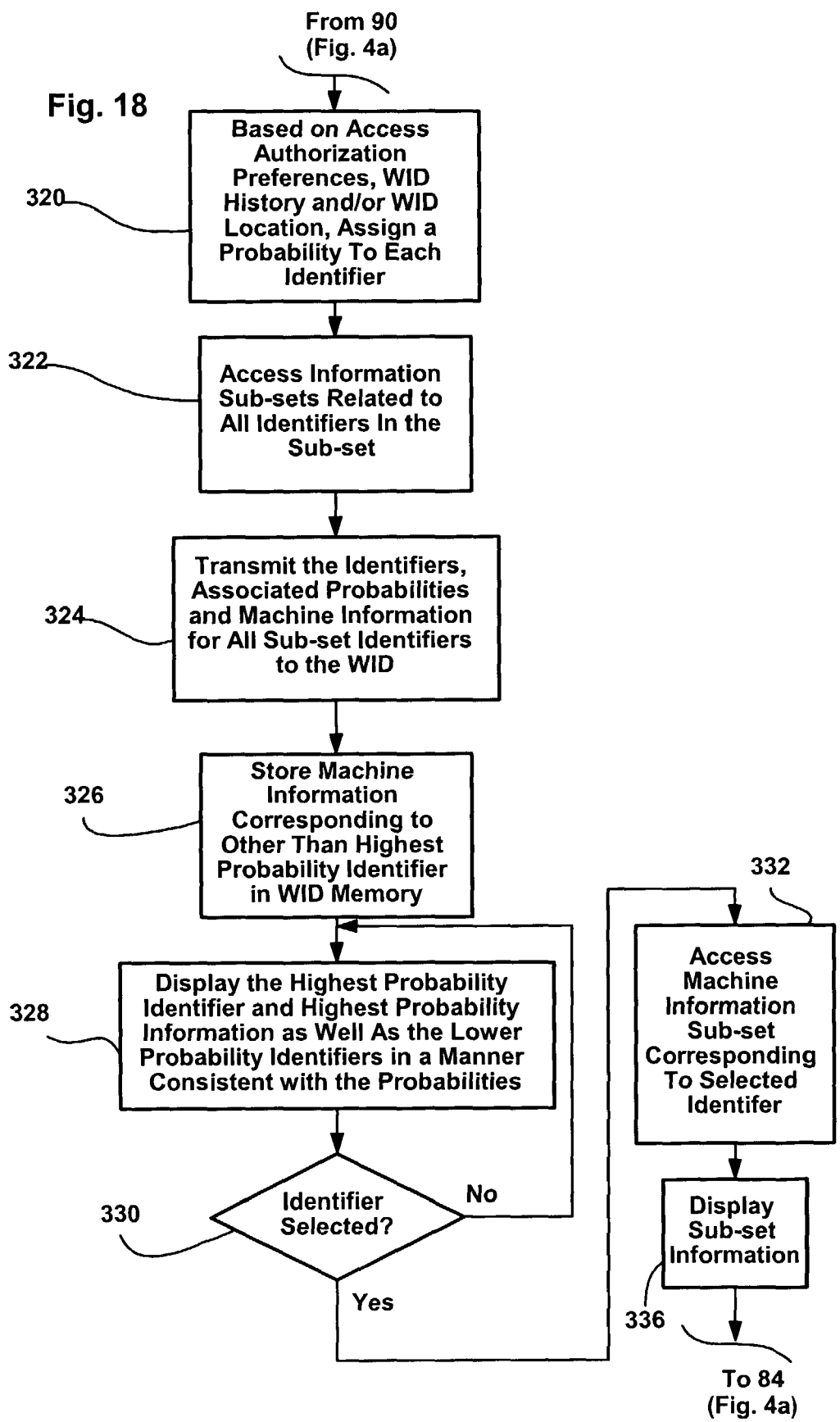

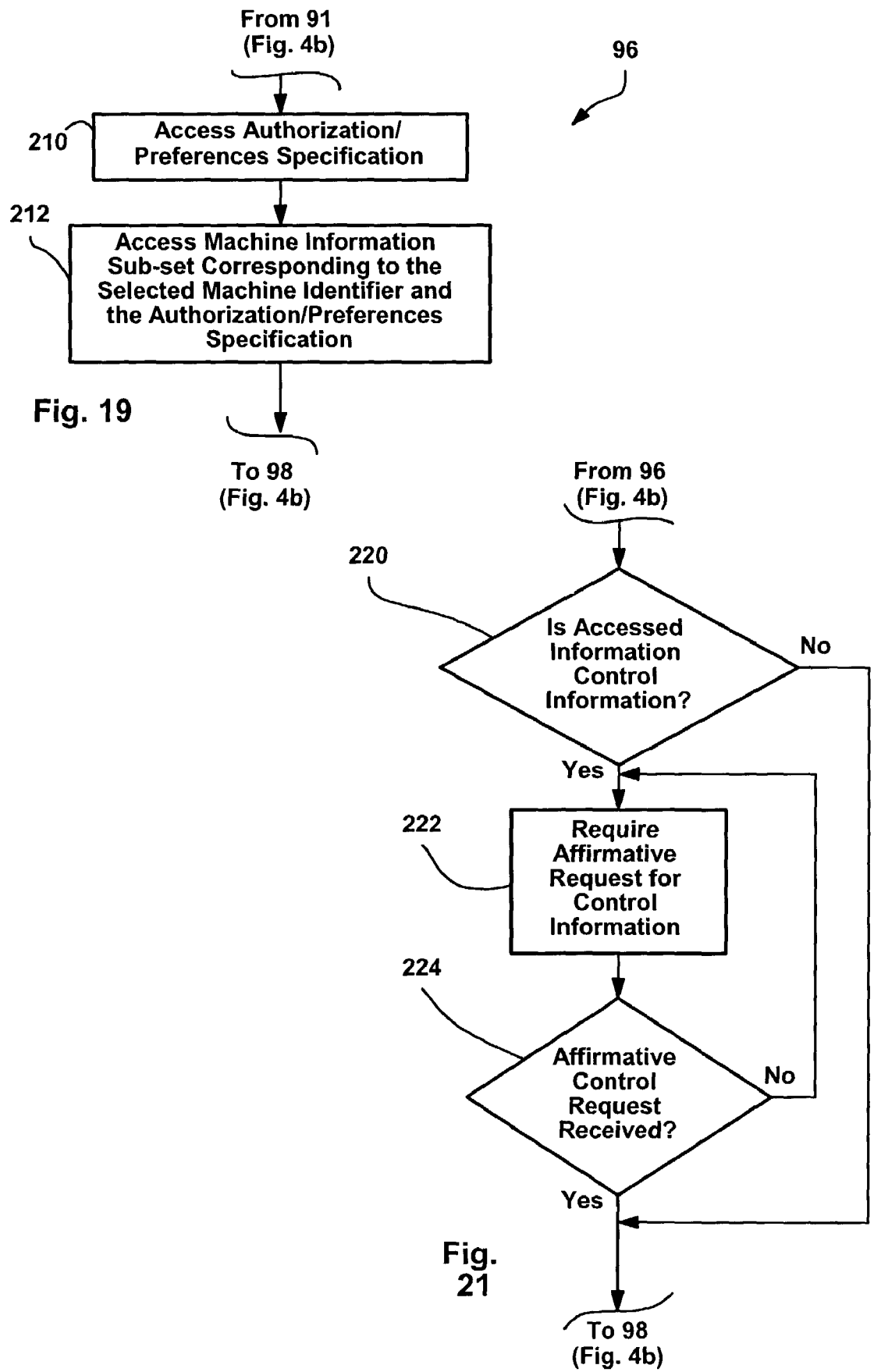

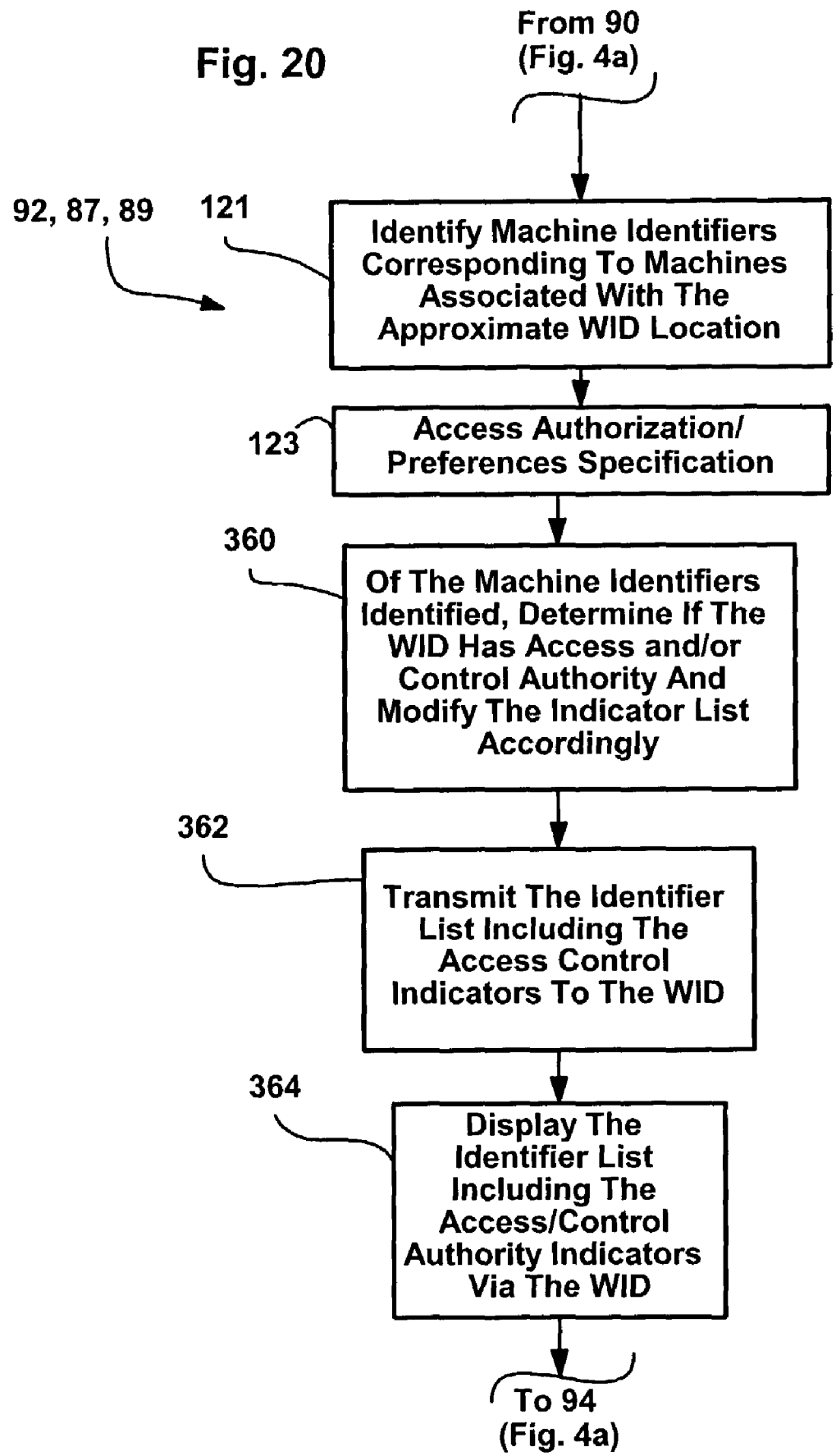

MACHINE ASSOCIATING METHOD AND APPARATUS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The field of the invention is wireless information devices and more specifically wireless devices for automatically obtaining location based information related to machines when a wireless device is placed within proximity of the machines.

There are many industries where electronic interfaces have been developed to facilitate monitoring or control or both system monitoring and control. For instance, in the industrial automation industry, a manufacturing plant may include several thousand different machines arranged to form a plurality of machine lines that cooperate to produce one or more products. In this case, each machine or a sub-set of machines may be equipped with an interface including a processor, some type of information output device and some type of information input device. The output device is often a display screen for displaying text, graphics, etc., and the input device is typically a keyboard.

Because of the nature of industrial automation, some industrial facilities have adopted policies requiring at least some level of local or location specific interfacing and control. In industrial control, many (e.g., tens or perhaps even hundreds) machines may be positioned along a machine line so that improper performance of or damage to one machine affects operation of a large number of related downstream machines. In addition, improper machine operation, given unforeseen circumstances, may result in injury to facility employees proximate the malfunctioning machine or proximate downstream machines. In these cases, if remote control were allowed, an operator may adjust one machine believing that some other similar machine is being adjusted with unintended and potentially costly results.

In an effort to avoid unintended results, most automated facilities require operators to be located adjacent or proximate a machine prior to altering machine operation. This proximity requirement is enforced by providing machine monitoring and controlling interfaces proximate associated machines. More specifically, the interfaces are typically placed in positions that enable an interface operator to observe machine operation prior to, during and after adjustment of machine operating characteristics. Here the interfacing is local despite remote or centralized processing. In this manner, an operator can essentially simultaneously observe operation of a particular machine and the information provided by an interface associated with the particular machine. This "dual viewing" capability facilitates a far more comprehensive understanding of machine conditions and enables the operator to quickly determine if control alterations have desired effects.

Requiring even basic interfaces at each machine or adjacent logically related sub-sets of machines is relatively expensive as each interface typically requires a display of some type and at least a set of control buttons or a keyboard of some type. To minimize costs many control systems are designed to provide pseudo-local or multiplexed control where one interface may be provided for several proximate machines. For instance, one interface may be provided for ten proximate machines.

Multi-machine interfaces represent a tradeoff between cost and functionality. TO this end, as indicated above, unfortunately, the "dual viewing" (i.e., simultaneous view of a machine and an associated interface) capability afforded by providing interfaces as close as possible to associated machines is hampered when the number of interfaces is less than the number of machines within a facility. Thus, in the case above, where a single interface is provided for ten separate but proximate machines, the interface may not be located in an optimal position for observing operation of a sub-set of the ten machines while simultaneously viewing the interface.

In addition, where a single interface is provided for more than one machine, the interface has to be relatively more complex than an interface provided for a single machine. To this end, to avoid confusion and unintended changes to machine operation, it is generally accepted that an interface should only display information corresponding to a single machine or a related sub-set of machines at any given time. For example, where a single interface is provided for accessing information corresponding to and controlling ten logically related machines, if the interface were programmed to provide information and controls for two or more of the machines at one time, an interface operator may examine data corresponding to one of the ten machines believing that the examined data corresponds to another of the ten machines or worse, the operator may adjust control of one of the ten machines believing that the operator is controlling another of the ten machines.

To avoid this type of confusion and related control errors, multi-machine interfaces are typically programmed to so that information and control tools corresponding to only a single one of the machines associated with an interface are provided at any time. Thus, multi-machine interfaces generally require some type of machine selection process and corresponding tools that allow a user to select which of several machines the user wishes to interrogate and/or control and hence are more complex that single machine interfaces that can automatically provide information to an operator.

Furthermore, in the case of multi-machine interfaces there is always the possibility that an operator may inadvertently select one machine believing that the operator has selected another machine for monitoring or control. Here, as above, the possibility for an unintended and costly result is great.

Second, as in most businesses, in an automated facility, there are many different types of employees and machine access and control requirements for the employee types are very different. For instance, a janitor likely has no need to access machine information or control machine operation, a maintenance engineer will require access to certain machine information and control capabilities and a process engineer may require access to a completely different set of machine information and control capabilities. Systems have existed for a long time (e.g., password protection, biometric comparison, etc.) that can restrict information access and control to specific authorized personnel. Unfortunately, these systems generally require relatively complex and expensive interface devices (e.g., a complete keyboard or some type of biometric scanner). As indicated above, in automation most interfaces are minimized to reduce costs and hence the added security that comes with restricting access and control to those having a need to access and control are often foregone.

One solution to the above problems that has been used in the automation industry is to provide hand held devices (HHDs) to machine operators having a need to monitor and/or control facility machines. (Unless indicated otherwise all portable information devices hereinafter will be referred to as HHDs, including PDAs, laptops, etc.). Here, an HHD, as its label implies, is a relatively small and portable device that can be carried around a facility by a machine operator. The HHD is typically provided with a small display screen, a set of buttons or a full keyboard to enable information interchange, a processor, a memory and a connection cable having a distal end configured to be received by a machine port. Each facility machine is provided with a machine port for receiving the HHD cable. To link to a local machine processor, the HHD cable is plugged into the machine port and establishes a one to one match where there is no ambiguity regarding which machine an HHD user is obtaining information for.

Here, information access and control can be restricted by restricting access to the HHDs. Thus, for instance, when a maintenance engineer enters a facility to perform maintenance duties, the engineer may check out an HHD from a central HHD location for use in the facility. After the maintenance engineer has completed his duties, the engineer may be required to check the HHD back into the central HHD location. To restrict access and control differently for different personnel there may be classes of HHDs where each class allows a user a unique set of access and control privileges (i.e., a maintenance HHD may have a first set of capabilities while a process control HHD may have a second set of capabilities).

Unfortunately the HHD solution described above also has several shortcomings. First, the manual process of linking an HHD to a machine processor is time consuming, burdensome and costly. Again, while one or a small number of linking processes may not seem burdensome, where the process has to be repeated several hundred times during an operator's shift, the combined linking tasks become excessive. In addition, in this case there may be a safety risk where an HHD becomes untethered from a machine in some way. One other problem with these types of plugs in HHDs is that access ports for receiving a tether may not always be readily accessible.

Second, where several hundred links may have to be made during a given day, the wear and tear on machine communication ports and HHD cable can be excessive and require either routine replacement or an extremely robust and expensive mechanical linking system.

Third, despite support for some customization regarding the types of information and control provided to a facility employee by way of configuring HHDs as a function of the type of employee that will use the HHD, there is no easy way to allow an employee to customize the appearance of information and control tools provided by the HHD. For instance, one maintenance engineer may want a first set of information presented in a first format while another maintenance engineer may want the same first set of information presented in a second format completely different than the first format.

Fourth, any system that requires an HHD to be tethered to a machine in order to obtain information related to the machine or to control the machine restricts operator movement and may not allow an operator to move into particularly advantageous positions to observe machine operations.

Also, in this regard, a mechanical tether is cumbersome to manipulate and therefore is bothersome.

Industries outside industrial automation have faced problems similar to those faced in industrial automation and have devised some solutions that are suitable to the respective industries. For instance, in the medical industry, it has been recognized that the ability to obtain information about a patient automatically upon entering the patients room is advantageous. In a medical facility, a process that requires a physician to manipulate a patient's arm to identify a patient ID on a wristband or the like and then enter the patient ID into an information device to obtain the patient's medical history is burdensome. The process may disturb a sleeping patient, requires that the physician come in close proximity to the patient, is subject to human error and is time consuming. The process is particularly burdensome in emergency situations where time may be of the essence.

European patent application No. 0,992,921 (hereinafter "the '921 reference") entitled "Computer Access Dependent On Location of Access Terminal" which was filed on Sep. 21, 1999 teaches a facility system wherein a separate wireless access point is positioned within each facility room for communicating with physician specific wireless HHDs located within the room. The '921 reference teaches that a physician identifier is stored in the HHD and, when an HHD is sensed within a room, the access point automatically obtains the physician identifier from the HHD, determines a degree of access (i.e., authorization) associated with the physician identifier, accesses information associated with the room (i.e., information associated with a patient within the room) and then transmits a sub-set of the patient information consistent with the physician's degree of access to the HHD for display.

The '921 solution works well in a facility that can easily be divided into cells separated by walls (i.e., patient rooms) and where there is only one set of information (i.e., information related to a single patient) associated with a particular cell. However, if a plurality of patients are located within a single room the '921 reference system cannot determine for which of the plurality of patients a physician seeks information. It is unclear how the '921 reference would resolve the quandary regarding which patient information to provide to a physician when more than one patient resides in a room. The '921 reference presents a problem where a physician may end up reviewing information corresponding to one patient while examining a different patient in the same room—clearly an unacceptable situation. In the context of an automated facility the '921 reference could not be used to select information corresponding to one machine out of a plurality of machines in a room for delivery to an HHD.

In addition, the '921 reference fails to teach or suggest any type of location specific equipment control. Failure to discuss equipment control is not surprising given the relatively course location resolution contemplated by the '921 reference.

Moreover, the '921 reference system and other systems of the same ilk require a relatively large number of access points to provide even the relatively coarse location resolution capabilities contemplated. System cost increases along with component count and therefore systems like the '921 reference system are relatively expensive.

In the office automation industry, U.S. Pat. No. 6,359,711 (hereinafter "the '711 patent") which issued on Mar. 19, 2002 and is entitled "System and Method for Supporting A Worker In A Distributed Work Environment" teaches a system where, like the '921 reference, a single access point is located within each room in a facility. The '711 patent teaches that HHDs (i.e., laptop computers) used by specific users are provided with user identifiers. A system database correlates user identifiers with information related to applications that the specific users subscribe to or have authorization to use. In addition, the database also includes information related to office equipment located throughout a facility where the equipment is associated with specific applications. For instance, a word processor application may require access to a printer, a window treatment control application may require access to motorized blinds and an HVAC application may require access to a thermostat control.

When an HHD is brought into a room, the access point senses the HHD, obtains the user identifier therefrom, accesses the database to identify applications associated with the user identifier, identifies which office equipment types the identified applications must access, locates the single instance of each identified office equipment type that is closest to the access point and then creates a control link between the laptop and the identified equipment instances.

While suitable for an office environment, the '711 patent control scheme is not suitable for an industrial automation environment for several reasons. First, the '711 patent system, like the '921 reference system, relies on clearly delineated and identifiable facility cells (i.e., rooms) and a single access point in each cell. Like the '921 reference, the '921 patent system cannot determine relative proximity between the HHD and a plurality of machines located within a single room. For instance, where an HVAC control, a printer and a laptop are located in the same room, the '711 patent cannot determine if the laptop is closest to the HVAC control or the printer.

Second, the '711 patent system teaches linking a laptop to the closest instance of each required equipment type independent of whether or not the instance is proximate the HHD. For instance, in the case of a word processor application requiring a printer, the '711 patent system locates a closest printer to an access point and enables control of the located printer irrespective of the distance between the printer and the laptop (i.e., the access point). Here, the printer may be five rooms away from the HHD and hence from the person operating the printer. This type of "blind" control is acceptable in the case of a printer application where the end results of an imperfect printing process is minimally costly. However, in the case of automated control of machinery, as indicated above, such blind control often cannot be tolerated.

Third, a system like the '711 patent system would cause confusion in an industrial control environment. To this end, while a particular user may have clearance to observe machine information corresponding to several different machine types and to control various machine types using various applications, simultaneously and automatically presenting information or controls corresponding to two or more machine types at a time would be confusing where only a single machine type can be controlled at any one time.

What is really needed in the industrial automation environment is a system that can be used to clearly associate a wireless HHD within a facility with a single facility machine for monitoring and control. One way to accomplish this HHD-machine associating task is to identify machine zones adjacent each facility machine, determine when a wireless HHD is within one of the zones and then provide machine information to the HHD corresponding to the machine associated with the zone for presentation to the HHD user. This method of associating cannot be achieved without precise location resolution.

World patent application No. WO 00/50919 (hereinafter "the '919 reference") which is titled "Method and Computer Readable Medium for Locating and Tracking a User in a Wireless Network Using a Table of Digital Data" teaches one system that can be used to relatively accurately determine location within a specific space or within a room. To this end, the '919 reference teaches a plurality of base stations or access points can be installed at locations within a facility. The access points each transmit signals of known strength to mobile HHDs within the facility. The strengths of the signals decrease as a function of distance traveled. The HHDs each receive the transmitted signals and, based on signal strengths of several of the received signals, determine the location of the HHDs within the facility.

World patent application No. WO 02/054813 (hereinafter "the '813 reference") titled "Location Estimation in Wireless Telecommunication Networks" teaches a location system similar to the system described in the '919 reference that relies on signal strength to determine location of a portable device within a facility. The '813 reference, however, applies a statistical model to the received signals to, supposedly, yield a far more accurate device location.

While each of the '919 reference and the '813 reference teach location determining systems that have better resolution than the room based systems described in the '921 reference and the '711 patent, it is likely that even with the increased resolution capabilities afforded by the '919 reference or the '813 reference, the location resolution requirements for a secure wireless industrial control cannot be achieved for several reasons. First, even where a signal strength based system supports relatively accurate location resolution throughout most of a facility, it may be that an unusually large number of moving metallic machines reside in certain facility areas that may introduce errors into transmitted signals thereby appreciably affecting received signal strengths. In this case, at least in areas including unusually large numbers of machines or machines having odd layouts, location position may not be accurately determined using the '919 and '813 reference systems.

Second, many industrial facilities are laid out according to space saving schemes that require adjacent machines to be juxtaposed relatively close to each other. In these cases machine zones corresponding to two or more adjacent machines may overlap so that, even a properly operating high resolution location determining system could not distinguish which machine information is sought in the overlapping region. Thus, for instance, assume that a location determining system identifies that an HHD is located in a space that is overlapped by three adjacent machine zones, here, the HHD may be provided with information corresponding to any one of the three machines corresponding to any one of the three overlapping zones.

Third, even where machine zones can be selected so that the machine zones do not overlap, many practical location determining systems may not be accurate enough to distinguish between adjacent zones. For instance, locating systems based on signal strength may only be able to distinguish general location within a room such as in which of four room regions an HHD resides or in which of sixteen equi-sized room regions an HHD resides or in which of 100 facility regions an HHD resides where each of the regions may includes several different machines.

In addition, there may be situations where a single area is associated with more than one machine zone. For instance, a transfer line may move items along a path adjacent thirty different machines. In this case it may make sense to be able to observe information corresponding to the transfer line at any location along the line and to observe information for each machine only adjacent each machine. Similarly, it may make sense to enable an HHD user to observe a machine or machine line layout map for a facility area from any space within the area or to observe machine specific information for one or more machines proximate an HHD user's specific location within the area.

Thus, it would be advantageous to have a system that could be used to unambiguously identify a machine for which information is sought and then associate an HHD and the machine so that machine specific information is obtainable with minimal HHD operator effort.

BRIEF SUMMARY OF THE INVENTION

It has been recognized that a location determining system can be combined with minimal effort from a wireless information device (WID) user to unambiguously form an association between a WID and a facility machine so that machine information can be displayed via the WID. To this end, in one embodiment of the invention the location determining system can generally determine WID location and narrow down the possible machines form within a facility region form which a user may seek information. Thereafter, the WID can present machine options to the user and enable the user to make a final and unambiguous decision regarding which machine's information to present via the WID. Once a machine is selected via the WID, the WID presents the corresponding machine information.

Thus, one object of the present invention is to unambiguously associate a WID with a machine. This object is accomplished by employing a simple solution where the WID user elects one of several possible machines for WID-machine association.

One other object is to provide an associating system that is relatively inexpensive. To this end, the location resolution of the location determining system needn't be extremely accurate and therefore overall system cost can be minimized.

Another object is to minimize the effort required of a WID user in forming the association. To this end, the above embodiment of the invention only requires that the WID user make a single machine selection and thereafter machine information is automatically provided via the WID.

In one aspect the inventive system may assign probabilities to each machine that is identified as a possible machine in a region form which a WID user may want information and then display machine identifiers in a manner that indicates the assigned probabilities to facilitate easy machine selection. Probabilities may be based on WID location (i.e., where the locating system can identify relative WID-machine proximities), WID identification (i.e., a maintenance WID may most likely seek information from one or two or a small number of machine types), a machine type selection made via a WID, etc.

Probability assignments may be earmarked via different fonts, font colors, font sizes, identifier order (i.e., the most probable identifier at the top of a list), etc. In at least one embodiment the information corresponding to the machine associated with the most probable identifier may be displayed automatically along with the most probable identifier while the less probable identifiers are displayed in some less prominent manner for selection. Here, where the user wishes to elect information corresponding to a machine other than the machine corresponding to the most probable identifier, the user simply selects the corresponding identifier and the information related thereto is automatically provided.

Once WID-machine association is formed and machine information is displayed, in at least one embodiment of the invention the system monitors WID location and, when the WID is removed from within a zone corresponding to the machine associated with the displayed information, the information presentation is altered by, for instance, indicating that the WID has been removed from the machine zone, removing the machine information from the display or in some other suitable fashion.

Consistent with the above, at least some embodiments of the invention include a method for identifying one of several different machines from within a facility for which information is to be presented via a wireless information device (WID), the method for use with a facility having a location identifying system capable of generally identifying WID location within the facility, the facility also including a wireless information system for transmitting information to a WID, a controller linked to the wireless information system and including a controller memory and a plurality of machines, machine information stored in the controller memory. Here, the method may comprise the steps of assigning machine identifiers to each facility machine, determining WID location within the facility, presenting machine identifiers corresponding to machines associated with the WID location to the WID user, receiving a selection indication via the WID indicating one of the visually presented machine identifiers, accessing machine information corresponding to the selected machine identifier, transmitting the accessed machine information to the WID and presenting the accessed machine information via the WID.

In addition, some embodiments of the method include the steps of assigning machine identifiers to each facility machine, assigning machine zones to at least a sub-set of the machines within the facility where each machine zone corresponds to a space within the facility in which it is suitable for a WID user to access information for an associated machine, storing the WID identifiers and correlated machine zones in the controller memory, determining WID location within the facility, accessing the machine zones within the controller memory and identifying if the WID is within at least one machine zone, where the WID is within at least one machine zone, identifying an identifier sub-set including machine identifiers associated with each zone in which the WID currently resides, transmitting the identifier sub-set to the WID and presenting the identifier sub-set to the WID user.

Moreover, according to some embodiments the method includes determining WID location within the facility, identifying a sub-set of the facility machines proximate the WID location and presenting the machine sub-set via the WID.

Other embodiments of the invention include assigning machine identifiers to each facility machine, determining WID location within the facility, presenting a machine identifier sub-set including machine identifiers corresponding to machines associated with the WID location to the WID user and repeating steps b and c to update the presented identifier sub-set as a function of WID location.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

BRIEF DESCRIPTION OF THE SEVERAL VIEWS OF THE DRAWINGS

FIG. 2b is a schematic diagram illustrating various components of the device of FIG. 2a;

FIG. 3 is a schematic diagram illustrating an exemplary authorization/preferences specification according to the present invention;

FIG. 5 is a flow chart illustrating a display default message process of FIG. 4a in greater detail;

FIG. 6 is a sub-process corresponding to one of the blocks of FIG. 4a;

FIG. 7 is a sub-process corresponding to a portion of FIG. 4a;

FIG. 8 is an exemplary screen shot for a WID according to the present invention;

FIG. 9 is similar to FIG. 8, albeit illustrating another screen shot according to a different aspect of the present invention;

FIG. 11 is a sub-process corresponding to another embodiment of the present invention and corresponding to the process illustrated above with respect to FIG. 4a;

FIG. 12 is a sub-process corresponding to one of the blocks in FIG. 4b;

FIG. 17 is another sub-process corresponding to another portion of FIG. 4a above;

FIG. 18 is one other sub-process according to a portion of the method of the 4a above;

FIG. 19 is a sub-process corresponding to a portion of FIG. 4a above;

FIG. 20 is one other sub-process corresponding to a portion to FIG. 4a above;

FIG. 21 is yet one more sub-process according to a portion of FIG. 4a above;

DETAILED DESCRIPTION OF THE INVENTION

Figure 1A:
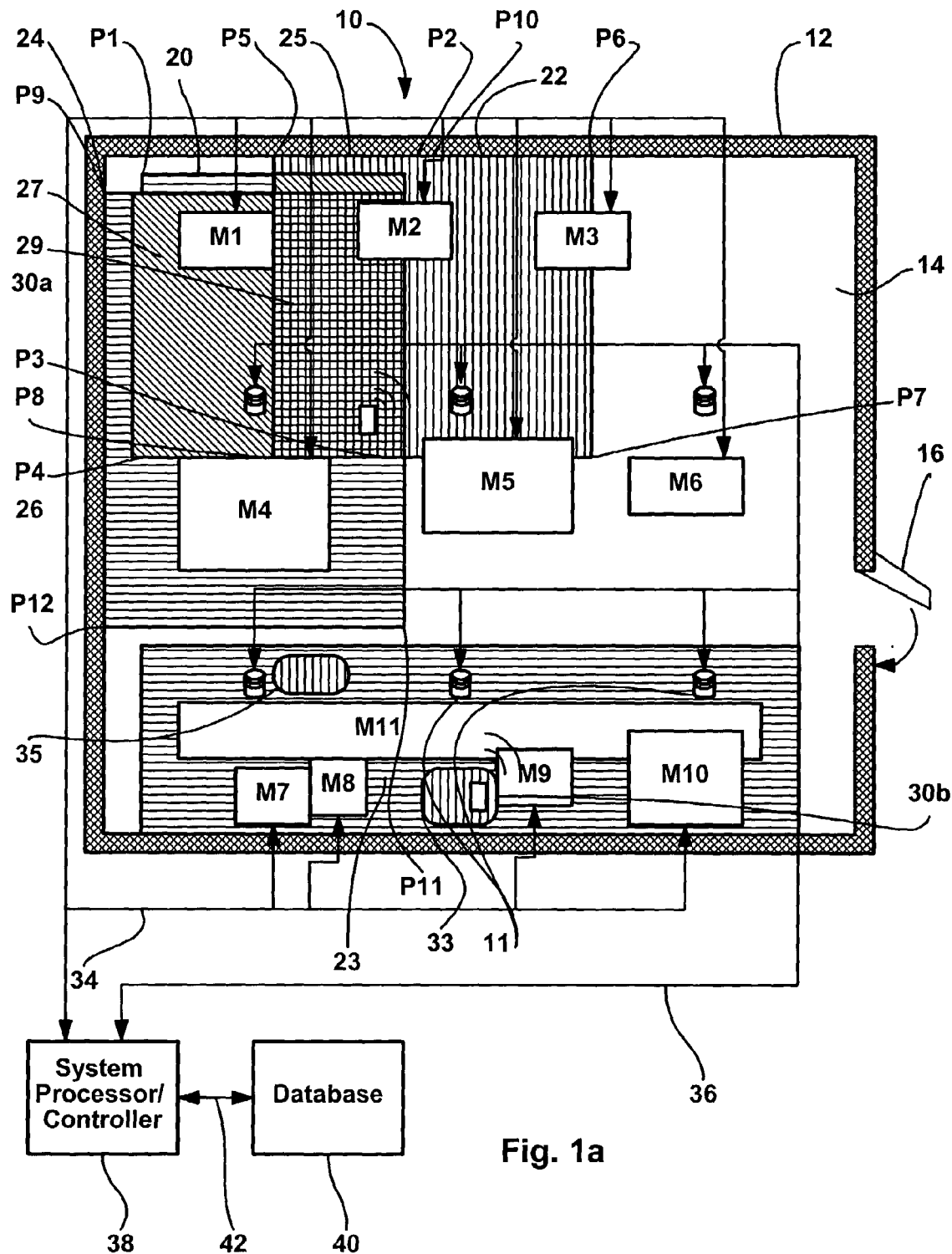
FIG. 1 is a schematic diagram illustrating an exemplary industrial facility and zone aspects according to the present invention.

Referring now to the drawings wherein like reference numbers correspond to similar elements throughout the several views and, more specifically, referring to FIG. 1a, the present invention will be described in the context of an exemplary, albeit simplified, manufacturing facility 10 that includes a rectilinear facility floor space or area 14 confined by four facility walls collectively identified by numeral 12. In the exemplary facility 10, entire area 14 comprises a single room (i.e., there are no wall partitions within facility 10 and all of the facility resides on a single level). A doorway 16 is provided to allow access to area 14.

As illustrated in FIG. 1a, exemplary facility 10 includes eleven separate machines identified by labels M1 through M11. The exemplary machines M1 through M11 may include any type of manufacturing machine such as a mill, a drill, a transfer line, a laser cutting device, a vision system, any of several different types of robots, clamps, etc. The machines M1 through M11 are shown as being different sizes to visually illustrate that the machines may have different physical footprints. For example, machine M4 is illustrated as having a much larger physical footprint than machine M8. Similarly, machine M11 is a relatively long machine when compared to the other illustrated machines. Hereinafter, it will be assumed that machine M11 is a transfer line. In general, machines M1-M11 are spaced out within area 14 although, in some cases, machines may be positioned directly next to each other such as, for instance, machines M7 and M8 or machine M11 and other machines M7, M8, M9 and M10 in FIG. 1a.

In FIG. 1a it is contemplated that each of machines M1-M11 includes at least one and, in many cases, a plurality of sensing devices (not illustrated) that sense machine operating characteristics and provide signals that can be used to facilitate machine monitoring via an interface (i.e., a WID). For instance, in the case of a drilling machine, sensors may include limit switches that are tripped when a drill slide reaches various positions along a travel path, on/off switches, speed sensing switches, motor operating characteristic sensors, etc.

In addition to including sensing devices, it is contemplated that most, if not all, of machines M1-M11 will includes some type of control interface to facilitate control and control adjustment. For example, again, in the case of a drilling machine, drill slide stroke length may be altered, drill speed may be altered, the angle at which a drill bit enters a work piece may be altered, etc.

Referring still to FIG. 1a, in addition to the components described above, facility 10 also includes a plurality of communication access points 11, a system processor/controller 38, a database 40, at least one wireless information device (WID) 30a, 30b and a plurality of two-way data buses 34, 36 and 42. Unless indicated otherwise WIDs will be generally referred to by reference 30a hereafter. Controller 38 may be positioned within facility 10 or may be located at some remote location such as, for instance, in a separate building, in a separate room within the facility that includes area 14 or at a completely different location such as a remote campus associated with facility 10. In addition, in many industrial environments, controller 38 will be physically associated with specific machine lines so that the controller 38 may be positioned, for instance, at the front end of a line of machines to facilitate easy access to machine operating characteristics adjacent the machines and/or to allow operating characteristics to be altered in a proximate manner. In FIG. 1a, controller 38 is linked to each of machines M1-M11 via a two-way data bus 34 that allows controller 38 to monitor machine operating characteristics as well as control machine operation.

Controller 38 is typically a processor based workstation capable of running various types of computer programs. For instance, some programs are machine control programs that enable controller 38 to either separately control each machine M1-M11 or, safely and precisely sequence machine operation thereby allowing relatively complex manufacturing processes to be performed in an efficient manner. In addition, other controller programs may allow controller 38 to derive various machine operating characteristics from monitored or sensed characteristics (e.g., motor voltage and current data is useful to derive stator and rotor resistance estimates, system inductances, identify harmonics, determine system torques, etc.) and to run complex algorithms to identify operating trends, alarm conditions, potentially unsafe conditions, maintenance requirements, raw material requirements and so on. Moreover, controller 38 also runs programs that facilitate data management and warehousing so that subsequent algorithms may be applied to warehoused data to identify historical operating patterns for various purposes.

Furthermore, controller 38 runs programs designed to facilitate interfacing with facility operators (e.g., maintenance personnel, process engineers, etc.) thereby providing control capabilities and system monitoring capabilities. To this end, controller 38 may include its own input and output interfacing devices such as a display screen, a keyboard, a pointing and selecting device such as a mouse or trackball or any other types of interfacing devices known in the art. Although not illustrated, other interfacing devices may be provided within facility 10 to enable monitoring and control.

Controller 38 is linked via two-way data bus 42 to data base 40. Controller programs are stored in database 40. In addition, data generated by controller 38 is stored in database 40 and can be accessed to allow examination of historical machine operating characteristics, real time operating characteristics and any other data generated by algorithms performed by controller 38.

Referring still to FIG. 1*a*, each information access point 11 includes a two-way wireless transceiver that, as well known in the computer arts, is capable of transmitting and receiving electromagnetic (e.g., radio or infrared) signals within an area proximate the transceiver. Wireless transceivers like access points 11 are well known in the industry and therefore, in the interest of simplifying this explanation, will not be described here in detail. For the purposes of the present invention, it should suffice to say that each transceiver 11 transmits information signals which decrease in strength as distances from the transceiver increase. In the illustrated example, six separate access points 11 are provided within area 14 and are generally equi-spaced within area 14. Typically, access points 11 will be mounted on the ceiling within an area 14 to allow relatively unobstructed communication between an access point 11 and other devices that communicate therewith. While access points 11 are illustrated as being substantially equi-spaced within area 14, it should be appreciated that other access point arrangements are contemplated and that, in many cases, other access point arrangements may be most suitable given specific machine layouts, the physical characteristics of each machine and machine zone layouts (described below).

Controller 38 is linked to each access point 11 via a two-way data bus 36 which allows controller 38 to receive information from the access points 11 and also allows controller 38 to provide information to each of the access points 11 for transmission within area 14. Information received from each access point 11 is typically tagged by the access point so that controller 38 can determine which access point 11 provided the received information. This tagging may either be performed by access point 11 earmarking data packets with an access point identifier (e.g., an access point number) or, in the alternative, may be facilitated by simply providing separate hardwires from each of the access points 11 to the controller 38. In a similar fashion, controller 38 and access points 11 are configured such that controller 38 can address information to each separate and specific access point 11.

Referring still to FIG. 1*a*, each WID (e.g., 30*a*) is generally a wireless handheld device that includes a transceiver like the transceivers that comprise access points 11 so that the WID 30*a* can wirelessly transmit information and can wirelessly receive information via electromagnetic communication or some other suitable wireless communication. Thus, generally, WID 30*a* is equipped to communicate with any access point 11 in area 14. It should be appreciated that, while the illustrated area 14 is relatively small, many industrial facilities may include much larger spaces such as, for instance, spaces including tens of thousands of square feet. In these cases, it is contemplated that the transmitting distance of a typical WID 30*a* will be insufficient to transmit information to all access points within a facility. In other words, while WID 30*a* may be able to communicate with each access point 11 within a facility, communication will be limited by signal strength capabilities and reliable transmissions will require a WID proximate access points.

To facilitate a good understanding of the present invention some phrases should be defined. To this end, unless indicated otherwise, hereinafter the phrase "access information" will be used to refer to machine operating characteristics and other machine data derived therefrom, either real time or historical. The phrase "access specification" will be used to refer to a specification that includes information that can be used by a WID 30*a* to present access information in a specific way (i.e., an access specification defines screen shots or presentations). Similarly, the phrase "control information" will be used to refer to information necessary to facilitate machine control. For instance, to adjust the stroke of a drill slide a WID operator must first know the current stroke limits—the current stroke settings comprise control information. In addition, the phrase "control specification" is used hereinafter to refer to a specification that includes information useable by a WID to present control information and to configure WID input devices to receive control input commands.

For instance, a control specification may associate certain WID buttons with specific control commands such as increase speed or decrease speed. In these cases the control specification may also include instructions to be displayed to a WID user that explain the button-function association. In the alternative, a control specification may define pull-down menus, control icons, touch screen buttons, etc., to be displayed via a WID screen. Here the control specification would also associate the screen selection tools with specific control functions. The screen and other types of control inputs will generally be referred to hereinafter as control tools.

Referring still to FIG. 1*a*, according to at least one embodiment of the present invention, sub-spaces within area 14 are earmarked or identified as machine zones associated with each of the separate machines M1-M11. Referring now to FIG. 1*b*, machines M1 and M2 are illustrated along with sub-spaces within space 14 (not marked in FIG. 1*b*) that are earmarked or identified as machine zones associated with each of machines M1 and M2. The machine zones associated with machines M1 and M2 are identified by numeral 43 and 47, respectively and a WID 30*a* is illustrated as being located within zone 43. Here it will be assumed that, ideally, information associated with machines M1 and M2 is only accessible via a WID 30*a* when the WID 30*a* is within the associated zone 43 or 47, thus ensuring that a WID user is proximate and perhaps in a "preferred" position with respect to each of the machines when accessing information associated with the machine.

It will also be assumed that the WID locating system is incapable of precisely locating a WID with a facility area 14 either because of inherent shortcomings in the system design or because of environmental characteristics that may cause system noise and hence locating errors. Moreover, it will be assumed that the location determining system can only narrow WID location down to within a relatively large WID position zone identified by numeral 49. It should be appreciated that the size of zone 49 may be location dependent and, more specifically, may depend on access point layout, location specific facility characteristics (e.g., metallic members in floors, walls, ceilings, machine orientation), etc.

Referring still to FIG. 1b, because the location determining system has relatively poor resolution capabilities, it is difficult for the location determining system to determine if the WID is within one of the small machine zones (e.g., 43 or 47 in FIG. 1b) or even to distinguish between proximate relatively small ideal machine zones. For instance, in FIG. 1b, with WID 30a located in zone 43, the system can only determine that WID 30a is somewhere within larger zone 49 which includes each of machine M1 zone 43 and a part of machine M2 zone 47. Thus, the location determining system cannot alone determine if WID 30a is located within one of the machine zones.

Referring again to FIG. 1b, according to at least one embodiment of the present invention, when machine zone ambiguity occurs, a WID user is provided tools to help resolve the ambiguity in a simple manner. For instance, in one embodiment, controller 38 identifies all machine zones (e.g., 43 and 47) that at least in part overlap a current WID position zone 49 and provides machine identifiers corresponding to associated machines (e.g., M1 and M2 ) via the WID 30a to a user for selection. Thus, the system automatically widdles down the universe of possible machines for which information might be sought to a proximate machine subset and then requests that the WID user make an affirmative selection prior to providing machine information.

Referring to FIG. 1c, in another embodiment, larger machine zones 20 and 22 may be specified for each of machines M1 and M2, respectively. In this case, controller 38 may be programmed to assume that WID 30a is in the middle of the WID position zone (see again zone 49 in FIG. 1b). Thereafter, as above, controller 38 identifies each of the larger machine zones (e.g., 20 and 22) in which the WID 30a resides and again offers zone options (e.g., associated machine identifiers for WID user selection). As illustrated, the larger zones 20 and 22 will generally surround the smaller ideal zones 43 and 47, respectively. Also, as illustrated, the larger zones may have different sizes that depend upon machine and environmental characteristics, ideal zone size, etc. In these cases, while a WID 30a may not be within the ideal zones associated with the machines (e.g., zones 43 and 47), by requiring an affirmative WID user selection process, ambiguity regarding which information is sought is eliminated.

While described above in the context of a location determining system that has relatively poor resolution, it should be appreciated that the inventive system and method may have applications in systems that can determine location relatively accurately. In this regard, in some cases two or more "ideal" information access machine zones may overlap therefore making it essentially impossible for a controller to determine independently for which of two or more machines a WID user may seek information. For instance, referring again to FIG. 1a, a small and ideal control machine zone 33 is earmarked adjacent one side of machine M9. In addition a large but nevertheless ideal transfer line zone 23 associated with machine M11 is illustrated where the transfer line zone 23 wholly includes control zone 33 associated with machine M9. In this case, when a WID (e.g., see WID 30b) is within zone 33 (and hence is also within zone 23), without input from a WID user the system cannot identify and provide desired information. Here the system provides at lease two machine identifier selections corresponding to machines M9 and M11.

Referring still to FIG. 1a, one option for a WID users within an area 14, in addition to observing machine information for a specific machine, may be to obtain area wide information such as a machine map similar to the schematic of FIG. 1a or production statistics for the overall area or to observe sub-area information such as machine line layout (e.g., information for one of four machine lines within area 14). In this case, area and sub-area zones may be specified and stored for access via controller 38 where the area and sub-area zones overlap machine zones and/or each other. For instance, an area zone in FIG. 1a may correspond to entire area 14 while a sub-area zone corresponding to the machine line including machines M7-M11 may include zone 23. Here, when a WID is within the area zone or a sub-area zone, other options, in addition to location based machine identifiers that may be presented to the user for selection may include an area identifier and one or more sub-area identifiers. As indicated above, each machine zone corresponds to a small region within area 14 in which it has been deemed suitable for a system operator (e.g., maintenance engineer) to access machine operating characteristics and/or control the machine associated with a particular zone. For instance, when a system operator is within zone 22 it may be suitable for the operator to access operating characteristics corresponding to machine M2 . Similarly, it may only be deemed suitable for an operator to control machine M1 when the operator is physically present within zone 20.

While area and sub-area zones are contemplated by the present invention, in order to simplify the present explanation, unless indicated otherwise, zones will generally be referred to as machine zones (i.e., the phrase "machine zones" will be used to refer to all types of specified zones including machine zones, area zones and sub-area zones).

Referring again to FIG. 1a, four separate and large machine zones 20, 22, 26 and 23 corresponding to machines M1, M2, M4 and M1 are illustrated. Although not illustrated, it is contemplated that other zones would be associated with each of machines M3, M5, M6 and M7 through M10. Because zones 20, 22 and 26 overlap, it is difficult to schematically distinguish one zone from another. To help distinguish overlapping zones, specific points or locations within area 14 are earmarked in FIG. 1a with the letter "P" followed by a location specific number (e.g., P1, P2, etc). Machine M1 and zone 20 includes the rectilinear space defined by points P1, P2, P3 and P4. Similarly, machine M2 space 22 includes the space defined by pints P5, P6, P7 and P8 while machine M4 space 26 includes the space defined by points P9, P10, P11 and P12.

As illustrated in FIG. 1a, various parts of zones 20, 22 and 26 overlap so that there are spaces where a location is within two zones and other spaces where a location is within all three zones 20, 22 and 26. In addition, there are also locations that are only within a single one of zones 20, 22 or 26. In FIG. 1a, single vertically or horizontally hatched zones (e.g., 26) include area that are within only one of zones 20, 22 and 26, angled hatched zones (e.g., 25, 27)

include areas within two of the zones and the vertically/horizontally hatched area 29 includes an area that is within all three of zones 20, 22 and 26. In the illustrated example, when WID 30*a* is located within area 29, the WID 30*a* presents/displays three machine identifier options corresponding to machines M1, M2 and M4. Similarly, when in other locations inside one of zones 20, 22 or 26, WID 30*a* presents/displays one or two of the machine options, depending on WID location.

An exemplary WID screen shot 170 that provides a machine identifier selection list for a WID 30*a* located within space 29 as illustrated in FIG. 1*a* is shown in FIG. 8. The screen shot 170 includes an instruction box 172 to guide the WID user in making a selection, a machine identifier list 174 that lists identifiers in ascending order (e.g., smallest identifier number first) and a user controllable selection icon 176 to select one of the identifiers in list 174. Although only three identifiers are provided in list 174, many more identifiers may be provided if additional machine zones overlap a specific WID location.

In cases where WID location can be determined relatively precisely and where the selection process is provided to allow a user to distinguish between overlapping zones and associated machines, it is contemplated that more than one machine zone type may be specified for a sub-set of the machines or for each of the facility machines. To this end, in at least one embodiment, two different types of machine zones are contemplated including control zones and access zones. Control zones are typically relatively small regions proximate associated machines where, when a system operator is within the control zone, the operator is in a particularly advantageous position with respect to the machine to visually observe important operating characteristics of the machine and to observe the effects on machine operation that are caused by control modification. For example, with respect to machine M11, the best and perhaps the only region in which to observe machine operation sufficiently during control modification may include small control zone 35.

It should be appreciated that each type of machine within a facility 10 will have different physical characteristics and therefore suitable control zones will be machine type specific. For instance, while a small zone 24 corresponds to machine M11, the control zone corresponding to machine M6 may include space on all sides of machine M6. It should also be appreciated that there may be some machines where the machine simply operates and no control zone is provided. For example, in FIG. 1*a* machine M8 may not be associated with a control zone.

In FIG. 1*a*, zone 23 is referred to as an access zone. As its label implies, an access zone is a region in which it has been deemed suitable for a system operator to access or monitor an associated machine's operating characteristics (i.e., access information). For instance, when an operator is within zone 23 it is suitable for the operator to access operating characteristics of machine M11.

As illustrated, typically, an access zone will be larger than the control zone corresponding to a single machine. For instance, access zone 23 is much larger than control zone 35 corresponding to machine M11. Access zones are larger than associated control zones because, generally, characteristic access or monitoring is much safer than machine control and an operator may wish to move about a machine while observing real time operating characteristics from various vantage points.

Referring still to FIG. 1*a*, it is contemplated that within a control zone like zone 35, a system operator should be able to access either control information or access information or access both control and access information at the same time. Thus, for instance, in at least some embodiments of the invention, within zone 35, an operator can access control and/or access information corresponding to machine M11 while within zone 23 the operator can only obtain access information corresponding to machine M11. In control zones where both access and control information may be accessed, in some cases both types of information will be accessed simultaneously if suitable. In other cases it is contemplated that a WID operator may be provided with some type of button, selectable icon, etc., to toggle back and forth between access information and control information.

In cases where WID location cannot be determined precisely and therefore a system is incapable of determining when a WID is within a small control zone, the WID may simply provide control and access options to the WID user when appropriate (i.e., when the user is authorized to control a machine, after a specific machine identifier has been selected by the user or when the user enters a space that is associated with a single machine zone). For instance, referring again to FIG. 1*a*, assume WID 30*a* first provides a selection list screen shot like shot 170 of FIG. 8. Thereafter, assuming the WID user selects the fourth machine M4 identifier and that the WID user is authorized to access both control and access information for machine M4, WID 30*a* provides a second selection screen shot requiring the WID user to select either access or control information. Upon receiving either an access or control selection, WID 30*a* presents the sought information. As another instance, where WID 30*a* is located within the single horizontally hatched portion of zone 26 that is only associated with machine M4, WID 30*a* may simply skip providing the first selection screen and directly provide the access/control selection screen. Thus, here, instead of relying on the system to enforce control rules related to proximately to essentially ensure that the user is controlling an intended machine, the affirmative control selection process ensures that the WID user is aware of a current WID-machine association and corresponding control capabilities.

In addition to access zones and control zones, a third zone type may be associated with at least a sub-set of machines. Here, it is contemplated that, in order to establish an association with a machine and hence obtain machine information, it may be desirable to require that an operator be relatively proximate (e.g., immediately adjacent) the machine but that, after the association has been established, it may be prudent to allow the operator to access machine information at locations relatively less proximate the machine. For instance, to initially associate with a machine and obtain access information an operator may have to be within five feet of the machine and thereafter, to continue to associate with the machine the operator may have to remain in a larger area including all space within fifteen feet of the machine. The larger zone of association described here is generally referred to as a "hysteresis zone".

Herein it will be assumed that entire area 14 comprises an access hysteresis zone for transfer line M11. Thus, after being located within zone 23 and associating a WID 30*b* with machine M11, if the WID 30*b* is removed from zone 23 and while remaining in area 14, the access information associated with machine M11 will continue to be displayed, in at least one embodiment, until a WID operator takes some affirmation step to either disassociate the WID and machine M11 or to associate the WID with some other machine, area or sub-area. The hysteresis zone associated with area 14 is an "access" hysteresis zone meaning that only access information, not control information, is accessible within the zone. Control hysteresis zones are also contemplated by the present invention although none are illustrated in FIG. 1a.

As indicated above, in some embodiments of the invention at least some of the hysteresis zones may include portions of machine zones or the entirety of machine zones associated with other machines. For instance, in FIG. 1a, the hysteresis zone (i.e., area 14) associated with machine M11 also includes the space surrounding the other machines in area 14. This overlapping feature enables a WID user to travel among related proximate machines so that, for instance, operating characteristics corresponding to a first machine (e.g., M11 in FIG. 1a) can be observed while adjacent a second related machine (e.g., M8 in FIG. 1a). Here, it is contemplated that in most environments overlapping hysteresis zones would be limited to access information and not control information to ensure that machine control remain localized.

In at least one embodiment of the invention no physical markers are provided within area 14 to distinguish control and access zones and instead the zones are earmarked electronically on a facility map that resembles the schematic of FIG. 1a and that is stored in database 40 for access by controller 38.

Generally, according to the present invention and referring still to FIG. 1a, controller 38 controls access and control information provided to WIDs 30a, 30b within facility 10 to ensure that machine access and control only takes place within the zones specified by the facility map stored in database 40. To this end, according to some embodiments of the invention, when a WID 30a is located within facility 10 and is turned on, controller 38, access points 11 and WID 30a cooperate to determine approximate WID 30a location within facility 10. Once WID 30a location has been approximated, controller 38 accesses the facility map in database 40 and determines if the approximated location is within one of the control or access zones corresponding to a specific machine. If the approximated location is within overlapping zones corresponding to two or more machines, areas or sub-areas, controller 38 identifies machine identifiers corresponding to the machines and provides those identifiers to WID 30a for display. When a machine identifier selection is provided via WID 30a, WID 30a transmits the selection along with a WID identifier to an access point 11 and thereby to controller 38. Thereafter, controller 38 accesses access and/or control information corresponding to a specific machine associated with the zone and wirelessly provides that information to WID 30a via a proximate access point 11. An operator can either access and monitor machine operation or, if within a control zone, may provide commands to controller 38 via proximate access points 11 to change machine operation.

In addition, in at least some embodiments of the invention, after access or control information has been provided to a WID 30a within a specific zone, if the WID 30a is removed from the zone, the system determines that the WID 30a has been removed from the zone and will limit the access or control information in some fashion. For instance, in one embodiment, when a WID 30a is removed from a control zone (e.g., 35), the control information is simply no longer provided via the WID 30a.

In addition, in at least one embodiment, when control information is rendered inaccessible via WID 30a, a message may be provided to the WID 30a operator indicating that the operator has left the control zone corresponding to the associated machine. In a similar fashion, when a WID 30a is removed from an access zone, some type of information limitation may take place, such as rendering the access information inaccessible via the WID, indicating that the WID 30a has been removed from the access zone while still providing the access information, etc. In at least one embodiment, access information corresponding to one machine may continue to be provided by a WID 30a until the WID 30a is taken into another machine zone. In other embodiments access information is provided as long as the WID remains within a hysteresis zone.

Figure 2A:
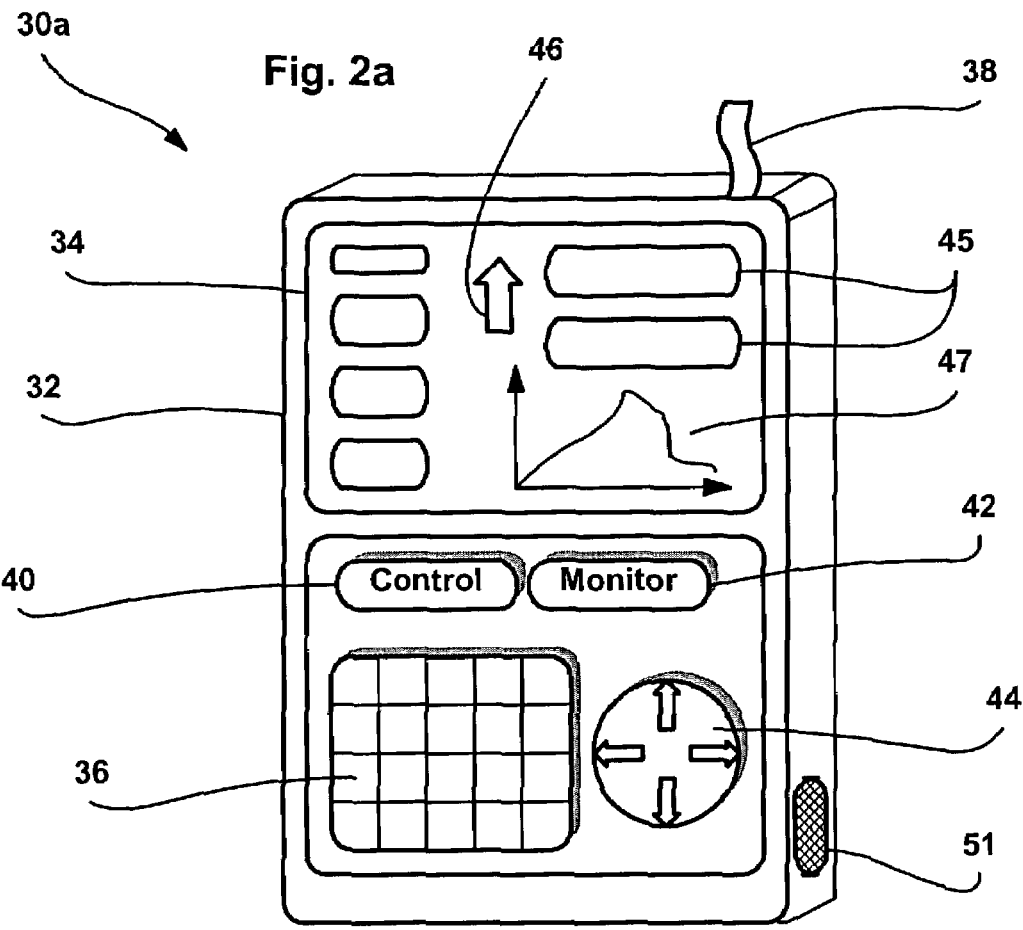
FIG. 2a is a perspective view of an exemplary wireless information device WID used with the present invention.
Figure 2B:
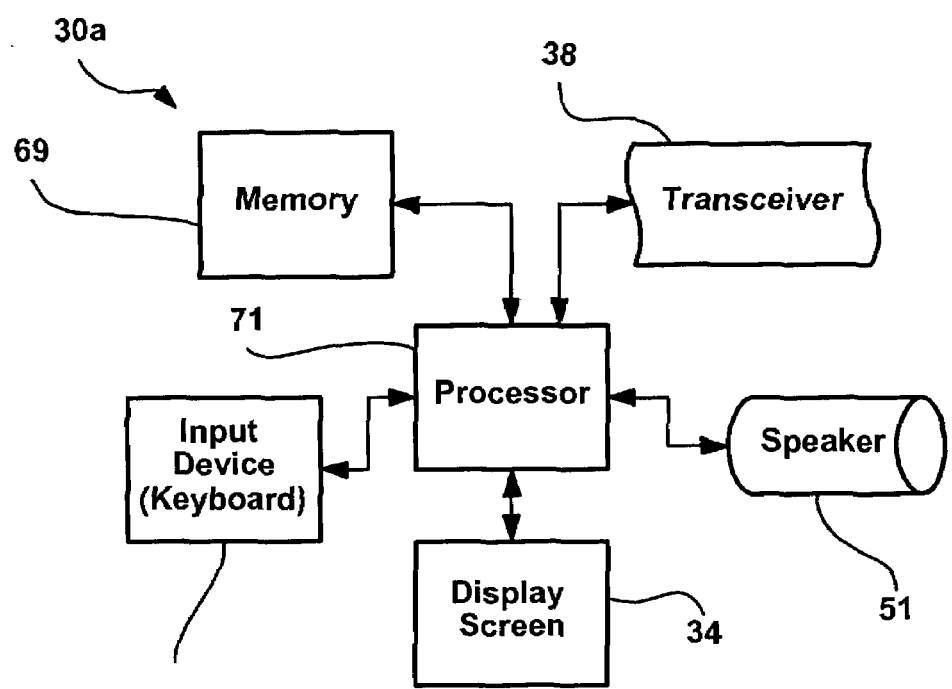

Referring now to FIG. 2a, a perspective view of an exemplary WID 30a is illustrated. Other components of exemplary WID 30a are illustrated in FIG. 2b. Exemplary WID 30a includes, generally, a plurality of components that are mounted within a hardened plastic or metallic housing identified by numeral 32. WID 30a components include a processor 71, an input device (e.g., keyboard 36), a display screen 34, a speaker 51 for audio output, a transceiver 38 and a memory 69. Processor 71 is linked to each of the input device, display screen 34, speaker 51, transceiver 38 and memory 69 for communication therewith. Processor 71 is equipped to run various programs for both displaying information via screen 34 and for receiving control signals and communicating those control signals to access points 11 (see again FIG. 1a) via transceiver 38.

The input device may include any of several different types of input components including a typical push-button keyboard 36, separate selection buttons 40 and 42, a rocker-type selection button 44, and/or selectable icons that may be provided via display screen 34 such as, for instance, icons 45. It is contemplated that, in at least one embodiment, a pointing cursor 46 may be movable about screen 34 and placed over one of the selectable icons (e.g., 45) after which a conventional type mouse clicking action may be used to select one of the icons to cause some display or control function to occur. In other embodiments display 34 may comprise a touch screen where icons are selectable via a stylus or the tip of an operators finger.

Display screen 34 may be any type of conventional display screen suitable for a handheld device and, for example, may be equipped to display numeric information, icons, graphs such as graph 47, bar charts, or any other type of monitoring and control information that may be associated with facility machines.

Speaker 51 is a conventional small audio output speaker which may be used for any purpose such as providing an audible indication when a WID 30a is removed from a zone, providing operating characteristics in an audible manner, etc.

Transceiver 38 is mounted proximate the top end of housing 32. As in the case of the transceivers that comprise access points 11, transceiver 38 is capable of transmitting electromagnetic signals and also receiving such signals so that information can be provided to controller 38 or received from controller 38 via access points 11.

Memory 69 stores the programs performed by processor 71 and also, in at least some embodiments of the invention, stores a WID identifier (e.g., a WID number, a WID user identification number, etc.). It is contemplated that some WIDs 30a may only be configured to provide access information and, in this case, the programs stored in memory 69 may only be access type programs. Where a WID 30a is equipped with control capabilities, control programs are stored in memory 69.

In addition to enforcing zone rules for each facility machine, it is contemplated that, in at least one embodiment of the invention, controller 38 (see again FIG. 1a) and associated system components may also be used to enforce information restriction requirements within a facility. To this end, as in many industries, in the industrial automation industry, there are many different facility employee types that have access to facility machines M1-M11. Each of the facility employee types will typically perform specific tasks with respect to facility machines and, to that end, require specific types of information, specific information layouts and/or specific control capabilities. For instance, in the case of a maintenance engineer, the maintenance engineer may require the capability to cause machines to run through specific machining sequences that are different than sequences that a process engineer may require. In this case, it is desirable to restrict the process engineer from performing the maintenance type control sequences while enabling the maintenance engineer to perform those sequences. Similarly, often a process engineer will require the ability to modify machine control characteristics in a fashion that is different than would be required by a maintenance engineer and, to that end, the process engineer's WID 30a may be provided with certain functionality that the maintenance engineer's WID 30a is not. Furthermore, even amongst maintenance engineers, there may be certain engineers that require greater control latitude than other engineers and, in fact, some lower level maintenance engineers may be completely restricted from machine control and only be allowed to access or monitor machine operating characteristics. Here WID 30a capabilities can be used to enforce facility access and control requirements.

Referring now to FIG. 3, an authorization/preferences specification 39 that may be stored in database 40 (see again FIG. 1a) is illustrated. Exemplary specification 39 includes six separate columns including a WID # column 130, a machine # column 132, an access authority # column 134, an access specification column 135, a control authority column 136 and a control specification column 138. As its label implies WID # column 130 lists a separate identifier or number corresponding to each of the WIDs 30 usable within a facility 10. For example, in FIG. 3, there are 1 through XX WIDs listed in column 130 and the identifiers are numbered 1 through XX.

As its label implies, machine # column 132 includes a list of all facility machines that can either be controlled or monitored via a WID for each WID identified in column 130. For instance, machines M1 through MNNN are listed for WID #1, machines M1-MNNN are separately listed for WID #2, and so on.

Access authority column 134 indicates, for each WID number and machine number combination in columns 130 and 132, whether or not the WID in column 130 has access authority for the machine in column 132. In column 134 a "Y" designator indicates at least some level of access authority while an "N" designation indicates no access authority for the particular WID- machine combination. For instance, in FIG. 3, WID #1 has at least some level of access authority for machines M1, M2, M4, M5, M7, M8 and MNNN and has no access authority for machines M3 and M6.

For WID number and machine number combinations where at least some level of access authority is allowed, different levels of access authority are identified by a qualifying number following each "Y" designation. To this end, in the exemplary specification 39, a "1" qualifier indicates full access authority meaning that the particular WID in column 130 can be used to access all information corresponding to the particular machine in column 132. Higher number qualifiers such as 2, 3, 4, etc., indicate lesser levels of access authority. For example, as illustrated in row 142 of FIG. 3, WID #1 has complete access authority for machine M1 while, as illustrated in row by 140, WID #1 has a second level of access authority (i.e., Y-2) for machine M4.

Access specification column 135 provides information that indicates how access information corresponding to a particular WID-machine combination from columns 130 and 132 should be displayed via the WID and may include, for instance, WID user preferences. For instance, two maintenance engineers may find different views of the same access information most helpful and information specifying preferred views is stored in the specification column 135. Default access specifications are contemplated in column 135 an "LOA" designator means that an associated WID lacks authority to access access information for the associated machine (i.e., LOA="Lack Of Authority").

Referring still to FIG. 3, control authority column 136 is similar to access authority column 134 and, to that end, includes "Y" and "N" designators and numerical qualifiers to indicate whether or not particular WIDs in column 130 have control authority and the degree of control authority those WIDs have over machines in column 132. For instance, WID #1 has a relatively low level control authority (i.e., Y-4) over machine #M1, has no control authority over machine #M2, no control authority over machine #M3, and so on. Note that with respect to at least some machines in column 132, some WIDs in column 130 may have access authority and not have control authority. For example, see row 144 where WID #1 has complete access authority over machine #M2 and has no control authority over machine #M2. Also note that different WIDs in column 130 have different levels of access authority and control authority over the same machines. For instance, in row 148, WID #2 has a low level (i.e., Y=8) of access authority in column 134 over machine #M1 while WID #1 has a high level of access authority over machine #M1. These different authority levels reflect the different information needs of facility employees. Also note that the same WID may have a high level of access authority and a low level of control authority over a specific machine (e.g., see row 149 where WID #2 has high level access and low level control over machine #M7).

Note that it is possible that, for a specific WID, the WID may not be authorized to obtain any information with respect to certain facility machines. In this case it is contemplated that some type of indicator would be provided to the WID user via the WID indicating lack of authority.

The control specification column 138 includes sets of preferences that indicate how control information should be displayed via a WID display for particular WID types or WID users. It is contemplated that the overall system may include canned control views that can be selected by WID users and that are then used to update the control specifications in column 138. In the alternative, it is also contemplated that, in at least some embodiments, some type of customization of views may be facilitated via either a WID 30c or some other type of commissioning interface such as a stationary PC, a dedicated controller 38 interface, etc.

Access and control authority may be assigned to specific WIDs in any of several different manners. For example, it is contemplated that some facilities may include WIDs that are used by many different facility employees where, when an employee enters a facility 10, the employee checks out an appropriate WID 30a from a central dispatch station. In this case, WIDs having certain capabilities would be checked out to appropriate employees. For instance, one type of maintenance WID 30a may be checked out to a particular maintenance engineer where the WID identifier (i.e., the number in column 130 of FIG. 3) is associated with appropriate access authority and control authority for the particular maintenance engineer. Where a process engineer checks out a WID 30a, the process engineer would check out a WID having a WID identifier associated with monitor and control authority required by the process engineer.

In the alternative, WIDs 30a may be personalized. For instance, personal digital assistants (PDAs) may be used as WIDs 30a. In this case, the WID identifier in column 130 of FIG. 3 may identify a particular PDA owner.

Referring again to FIG. 1a, the invention also contemplates a system wherein machine indicators are physically associated with specific machines within the facility 10 so that a WID user can correlate identifiers presented by a WID with the indicators associated with the machines to verify that information is obtained for an intended machine. Here, the indicators may be physically printed or attached to some part of the actual machines and placed in visually obvious locations for viewing. In at least one embodiment it is contemplated that the indicators may be relatively descriptive so that a WID user familiar with machine types can make an additional mental correlation between a machine on the facility floor and a machine identifier selection presented via display 34. For instance, an indicator may include "second two foot slide drill press on machine line #33" which could be visually confirmed by the WID user. Here, a displayed machine identify selection would simply include "second two foot slide drill press on machine line #3".

In other embodiments the physically associated machine identifiers may simply include non-descriptive labels such as M1, M2, etc. which, as above would be provided on or proximate associated machines. In this case, the non-descriptive indicators may be reusable in different facility locations. For instance, in most facilities it will be impossible to observe more than twenty or so machines from any specific location. Assuming a facility where no more than twenty machines are viewable from any one location, non-descript indicators M1 through M20 would be sufficient to provide all machine selection options for any given facility location. Here, it is contemplated that indicators M1 through M10 would be reusable with similarly tagged machines spatially separated so that no two similarly tagged machines could be observed from any specific facility location.

Assume a WID user wants to obtain information for machine M2 and is in the location corresponding to WID 30a as illustrated. In this case, WID 30a may present a machine list including machines M1, M2 and M4 to select from. The WID user observes the indicator M2 on the specific machine M2 for which information is sought and mentally correlates indicator M2 with the identifier M2 in the WID list and then makes the appropriate selection.

Figure 4A:
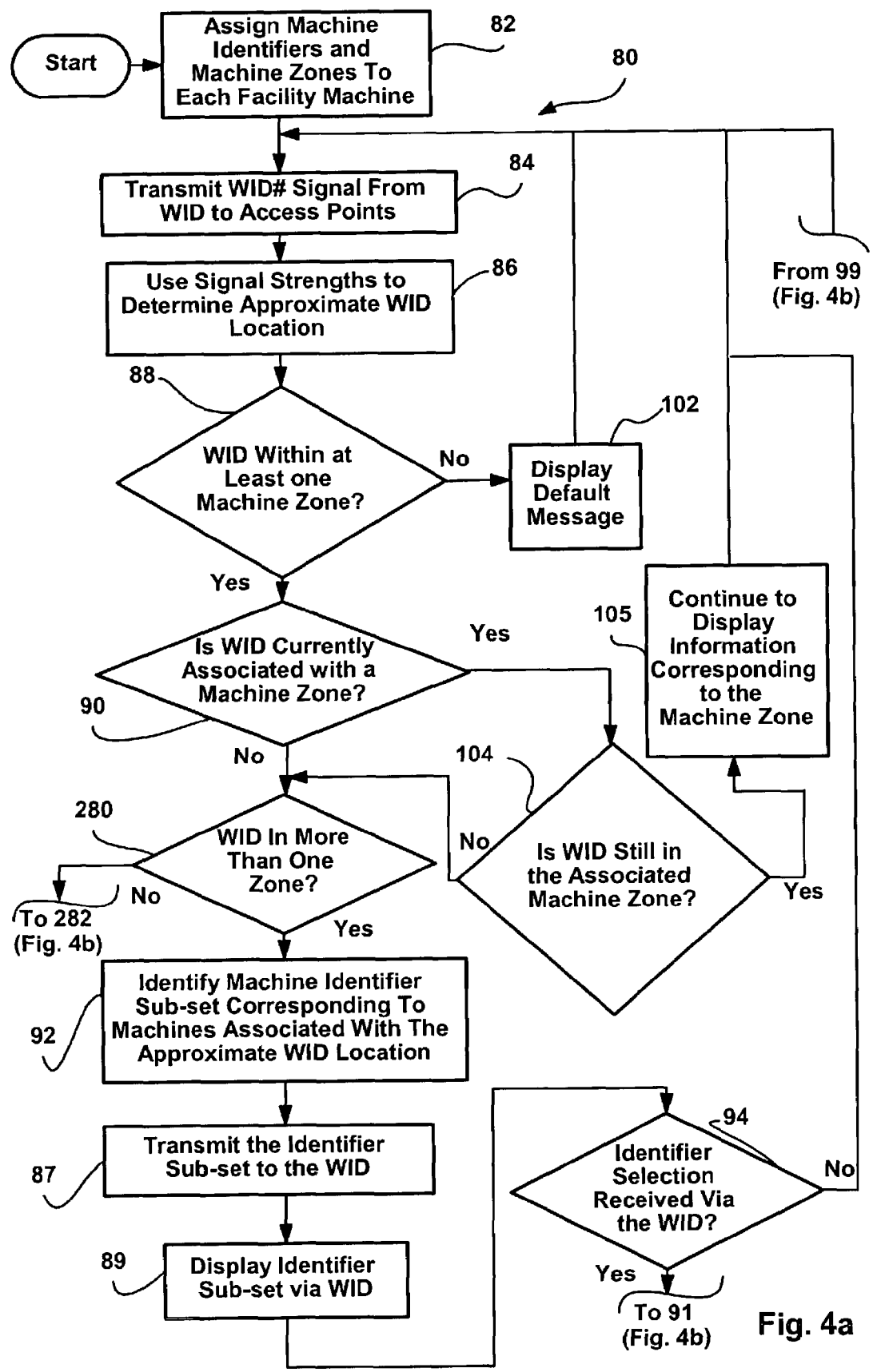
FIGS. 4a and 4b together include a flow chart illustrating one method for providing machine zone specific information to a WID according to the present invention.
Figure 4B:
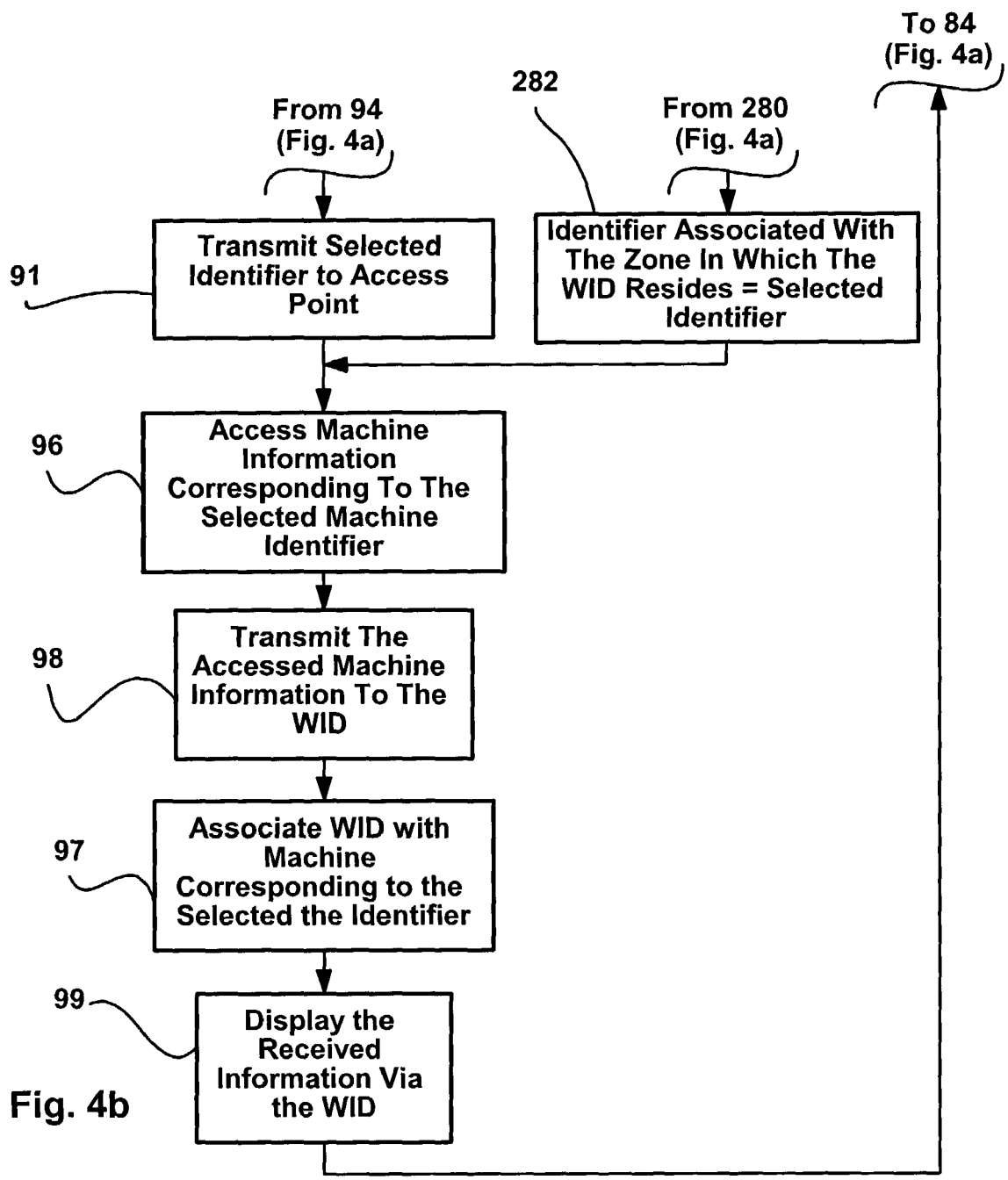

Referring now to FIGS. 4a and 4b, one method 80 according to the present invention is illustrated. Prior to method 80 it is assumed that controller 38 and database 40 are programmed and configured to obtain machine information from each of machines M1-M11 and to store that information in a correlated fashion with a list of machine identifiers (e.g., M1, M2, etc.). Referring also to FIGS. 1, 2a, 2b and 3, at process block 82, machine identifiers and machine zones are assigned to each machine M1-M11 within facility 10 during a system commissioning procedure. The commissioning procedure, in general, lays out the range of control zones, access zones and, where appropriate hysteresis zones, for each particular machine. Various commissioning procedures for identifying machine zones are contemplated. After the control, access and hysteresis, zones have been identified, an electronic map (e.g., see again FIG. 1a) of the facility 10 including the identified zones is stored in database 40.

After the machine zones have been identified and electronically stored in database 40, when a WID 30a is turned on and is brought into a facility area 14, the WID 30a transmits a WID identifier or number at a specific and known signal strength to access points 11 proximate the WID 30a at block 84. When an access point 11 receives the transmitted signal, the access point 11 identifies the signal strength and the WID identifier and packages those two bits of information along with an access point identifier and transmits this information packet via data bus 36 to controller 38. At block 86, controller 38 uses the signal strengths and the access point identifiers to determine the approximate location of the specific WID within room 14.

Any of several different methods to determine WID location using signal strength may be used. For instance, a signal triangulation method whereby the intersection of three access point signal strength circles is used to determine location may be employed. Other statistical methods of locating are also contemplated including those described in WO 02/054813 referenced above. At block 86, after WID 30a location has been precisely identified, controller 38 access the facility map in database 40 and determines in which, if any, machine zone the WID 30a is located.

As indicated above, in the present example, it is assumed that the system for locating a WID within area 14 is relatively imprecise and therefore, instead of providing a specific location within area 14, when the location determining algorithm is performed, a WID position zone like zone 49 in FIG. 1b is identified. Thereafter, still at block 86, controller 38 identifies the central point of the WID position zone 49 and assumes that the WID 30a is located at the central point.

Continuing, at decision block 88, controller 38 determines whether or not the assumed WID location is in a machine zone. At block 88, where the assumed WID location is not within a machine zone, control passes to block 102 where the system causes WID 30a to display a default message. To this end, referring also to FIG. 5, in at least one embodiment, the process of displaying a default message includes transmitting a message such as "You are not currently in a machine zone" at block 150 to the WID 30a via access points 11 and then displaying the received message at block 152 via the WID. This simple location status or guidance message reduces WID user confusion by giving some type of indication of where the WID user is with respect to the zones.

At block 103, controller 38 disassociates the WID from all zones. Disassociation is provided in the illustrated embodiment to ensure that, upon entering another machine zone, the WID 30a is free to associate or more properly, be associated by controller 38, with the new zone.

Referring again to FIGS. 1-3, 4a, 4b and also to FIG. 5, after block 103, control passes back up to block 84 where the system again determines approximate WID location within facility 10. Thus, where WID 30a is initially not within a machine zone but is moved into a machine zone, the looping process through blocks 84, 86 and 88 eventually determines that the WID 30a is within at least one specific machine zone.

Referring again to block 88, where the assumed WID 30a location is within a machine zone, control passes to block 90 where controller 38 determines if WID 30a is currently associated with a specific machine zone. To this end, where WID 30a remains within one zone during consecutive passes through the process 80 in FIG. 4a or is moved from one zone directly into an adjacent zone between consecutive passes through process 80, during the second pass through process 80, at block 88, the WID 30a is associated with the machine zone in which the WID resided during the first pass through process 80.

In this case, control passes to block 104 where controller 38 determines if the WID 30a is still in the machine zone that the WID was most recently (i.e., during the previous pass through process 80) associated with. Here, for instance, were WID 30a remains in the same zone during consecutive passes through process 80, WID 30a will still be in the associated machine zone and control passes to block 105. At block 105 controller 38 causes WID 30a to display the sub-set of machine information corresponding to the zone that the WID is associated with and control again passes back up to block 84 where the process 80 is repeated. By looping back up through block 105 instead of down through the lower blocks in FIG. 4a when the WID zone remains the same between consecutive process 80 cycles, unnecessary steps required to re-associate a WID and a machine zone are avoided. The end result is that the information displayed by WID 30a remains unchanged between consecutive process cycles where the WID zone is unchanged.

At blocks 90 and 104, where the WID is either not currently associated with a machine or is not still in a currently associated machine zone, respectively, control passes to block 280 where controller 38 determines if WID 30a is in more than one overlapping machine zone. Where WID 30a is in two or more overlapping zones, control passes to block 92.

At block 92, controller 38 identifies a machine identifier sub-set corresponding to the overlapping machine zones in which WID 30a is located. Next, at block 87, controller 38 transmits the identifier sub-set via access points 11 to WID 30a. At process block 89 WID 30a displays the sub-set of identifiers. Again, referring to FIG. 8, an exemplary screen shot 170 that may be provided to display the identifier sub-set is illustrated.

Continuing, at block 94, after the identifier sub-set has been displayed for selection purposes, WID 30a waits for a selection to be made by the WID user. At block 94, where no selection is made, control passes again back up to block 84 where the process described above is repeated so that, if the WID is transported into a different location within area 14 which is differently associated with the machine zones, WID 30a and controller 38 can together automatically alter the identifier sub-set list presented to the WID user. Referring still to decision block 94, if an identifier selection is received, control passes to block 91 in FIG. 4b.

Referring now to FIG. 4b and also to FIGS. 1a, 2a, 2b and 3, at block 91, WID 30a transmits the selected identifier to proximate access points 11 and thereby to controller 38. At block 96, controller 38 accesses machine information corresponding to the selected machine identifier and at block 98 controller 38 transmits the access machine information via access points 11 to WID 30a. At block 97, controller 38 associates WID 30a with the machine corresponding to the selected identifier. At block 99 WID 30a displays the received machine information for the user to observe. After block 99, control passes back up to block 84 in FIG. 4a and the process is repeated.

Referring still to FIGS. 4a and 4b, at block 280, where WID 30a is in a single machine zone (i.e., is located in one and only one machine zone), control passes to block 282 in FIG. 4b. In this case, in at least one embodiment, there will be no reason to present an identifier list to the WID user as there is only one machine identifier option associated with the assumed WID location. At block 282 controller 38 sets the selected identity equal to the identifier associated with the zone in which the WID currently resides. For instance, in FIG. 1a, 1f WID 30a is located to the left of machine M4 as illustrated and in zone 26, controller 38 selects the identifier associated with machine M4. After block 282, control passes to block 96 where controller 38 accesses machine information and cycles through subsequent blocks 98, 97 and 99 prior to passing control back to block 84 as described above.

Thus, it should be appreciated that the shortcomings associated with a low resolution WID locating system can be substantially overcome by enabling a WID user to eliminate ambiguity regarding information sought from among a plurality of proximate machines. Here, where the locating system cannot distinguish which of two machines a WID user seeks information for based solely on location, the system presents location based options for the WID user to select from. Where there is no ambiguity regarding which of several machines a user can seek information for, the system may automatically provide machine information without requiring an affirmative selection process.

According to another embodiment of the invention, referring again to FIGS. 4a and 4b, blocks 280 and 282 may be entirely eliminated so that, even where there is only one machine identifier to be included in the identifier list, the single option list is still provided and a affirmative selection step is still required prior to providing any type of machine information. Here, it should be appreciated that, as indicated above with respect to FIGS. 1b and 1c, often the zones (e.g., 20, 22) used to identify if a WID is proximate a machine may be much larger than ideal machine zones (e.g., 43, 47). Thus, at block 88, despite being in only one zone, the WID user may not want information corresponding to the specific machine associated with the zone in which it is assumed the WID currently resides.

Referring now to FIG. 6, a more detailed process corresponding to process block 92 of FIG. 4a is illustrated. Referring also to FIG. 4a, when a WID is not currently associated with a machine zone or is no longer within a currently associated machine zone, control passes from either block 90 or block 104, respectively, to block 121 where controller 38 identifies all machine identifiers corresponding to machines associated with the approximate location of WID 30a. Next, at block 123, controller 38 accesses the authorization/preferences specification (e.g., see 39 in FIG. 3) that is stored in database 40 to determine whether or not the WID user (or specific WID) is authorized to obtain information corresponding to machines associated with the identified machine identifiers and whether or not the user's preferences provide any information regarding the particular machine identifiers. At block 125, controller 38 identifies a sub-set of the machine identifiers that is consistent with the access authorization/preferences specification 39. Control passes from process block 125 back to block 87 in FIG. 4a where the identifier sub-set is transmitted to WID 30a for display.

Thus, the inventive system can be used to automatically enforce access and control rules by limiting the universe of selectable machine identifiers to identifiers associated with proximate machines, and for which the WID user is authorized to obtain information. Here, only identifiers corresponding to machines that a particular user or WID is authorized to obtain information for are provided.

According to other inventive embodiments, to avoid user confusion, controller 38 may be programmed to provide additional information to the WID regarding machine information access. For instance, according to at least one aspect, controller 38 may be programmed to identify two identifier sub-sets including a first sub-set consistent with the access authorization/preferences specification and a second sub-set inconsistent with the access authorization/preferences specification but including other identifiers corresponding to zones in which the WID currently resides. For instance, in FIG. 1*a*, assume WID 30*a* is located as illustrated and hence resides in all three overlapping zones 20, 22 and 26. Also assume WID 30*a* is associated with a user that is authorized to access information corresponding to machines M1 and M4 but that is not authorized to access information corresponding to machine M2. Here, controller 38 would identify a first sub-set including machine identifiers M1 and M4 and the second sub-set including identifier M2. Referring again to FIG. 4*a*, in this embodiment, both the first and second sub-sets would be transmitted to WID 30*a* and both sub-sets would then be displayed such that only identifiers M1 and M4 are selectable and identifier M2 is provided with an indication that the particular user/WID cannot access information for the second machine M2.

A detailed sub-process corresponding to blocks 92, 87 and 89 in FIG. 4*a* where controller 38 identifies and provides two sub-sets is illustrated in FIG. 7. In FIG. 7, blocks 121 and 123 are similar to the identical blocks in FIG. 6 where the controller identifies machine identifiers corresponding to the assumed machine location and then accesses the access authorization/preferences specification. At block 354, controller 38 separates the identified machine identifiers into first and second sub-sets that are consistent and inconsistent, respectively, with the authorization/preferences specification. At block 356 the two sub-sets are transmitted to WID 30*a* and at block 358 WID 30*a* displays the selectable first identifier sub-set and the unselectable second identifier sub-set.

In a similar fashion, referring to FIG. 20, one other sub-method corresponding to blocks 92, 87 and 89 in FIG. 4*a* is illustrated where controller 38 separately determines whether or not access information and/or control information is accessible via a WID for each one of the identified machine identifiers. To this end, again, at after block 90 in FIG. 4*a*, control passes to block 121 and 123 where controller 38 identifies machine identifiers corresponding to machines associated with the approximate WID location and accesses the authorization/preferences specification. At block 360, of the machine identifiers identified, controller 38 determines if the WID has access and/or control authority for each one of the separate identifiers and then modifies the indicator list accordingly. At block 362 controller 38 transmits the identifier list including the access control indicators to WID 30*a* and at block 364 WID 30*a* displays the identifier list including the access/control authority indicators. An exemplary screen shot 370 that may be provided pursuant to the sub-process of FIG. 20 is illustrated in FIG. 9 and includes an instruction box 372, a plurality of icons collectively identified by numeral 374 and a clarification box 376. As above, the instruction box 372 simply provides instructions to the WID user indicating how to select options for the list which follows thereafter. Icons 374 include separate icons for each one of the machines for which the WID user can obtain information and, in some cases, may include two separate icons for each one of the machines, an access icon and a control icon. In FIG. 9, both an access icon and a control icon are provided for machine M1 and only access icons are provided for machines M2 and M4 because, presumably, the specific WID used to provide the identifier list is not authorized to obtain control information corresponding to machines M4 and M2. Consistent with this limitation, clarification box 376 indicates that the specific WID cannot obtain control information corresponding to machines M4 and M2 thus minimizing WID user confusion.

Figure 10:
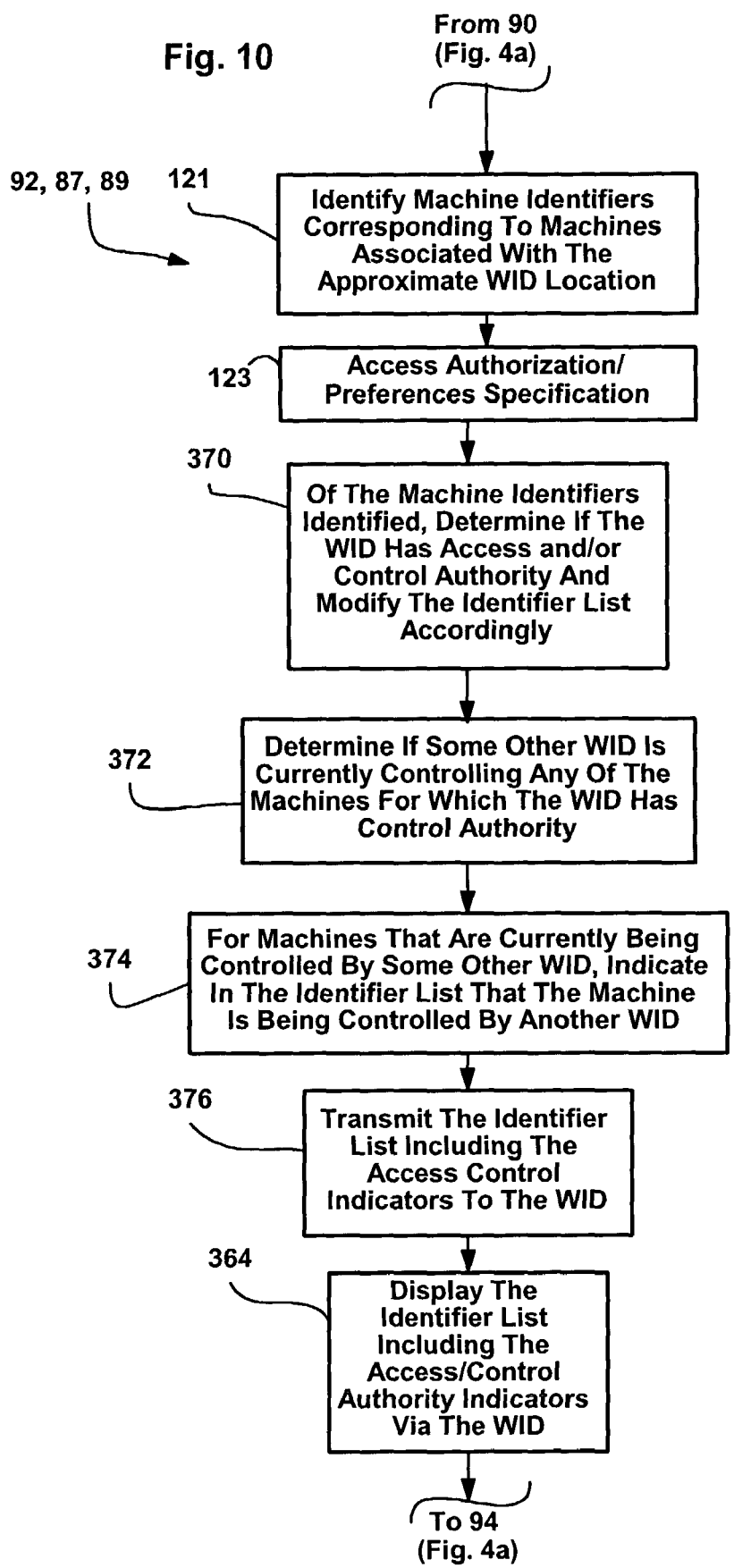
FIG. 10 is similar to FIGS. 8 and 9, albeit illustrating another screen shot.

In addition to enforcing zone rules and monitor and control authority rules as described above, the inventive system can also be used to enforce other facility rules. For example, it may be desirable to limit control of a machine to a single WID user at any given time while allowing multiple WID users to access information corresponding to one machine at the same time. An exemplary sub-process that limits control of machines to a single WID at a time and that can be substituted for block 92, 87 and 89 in FIG. 4*a* is illustrated in FIG. 10. In this regard, after block 90 in FIG. 4*a* control again passes to blocks 121 and 123 where controller 38 identifies machine identifiers corresponding to machines associated with the WID location and access the authorization/preferences specification. At block 370, of the machine identifiers identified, controller 38 determines if the WID has access and/or control authority for each of the identifiers and then modifies the identifier list accordingly. At block 372, controller 38 determines if some other WID is currently controlling any of the machines for which the WID has control authority. At block 374, for machines that are currently being controlled by some other WID, controller 38 indicates in the identifier list that the machine is being controlled by another WID. Continuing, at block 376, controller 38 transmits the identifier list including the access control indicators to WID 30*a* and at block 364, WID 30*a* displays the identifier list including the access control authority indicators and any indications that other WIDs are controlling machines via the specific WID.

Referring now to FIG. 11, a screen shot 378 consistent with a system that limits control of machines to a single WID at one time is illustrated. To this end, screen shot 378 includes an instruction box 380 like the box illustrated in FIG. 9, selectable icons collectively identified by numeral 382 which correspond to machine access and/or machine control selectable identifiers and a clarification box 384. FIG. 11 is similar to FIG. 10 except that there is no machine M1 control identifier and, instead, clarification box 384 indicates that another WID currently has control of machine M1.

One other feature contemplated by the present invention is that controller 38 may be programmed to, based on various types of information, rank machine identifiers according to the likelihood that a WID user will want to obtain information with respect to associated machines. For example, referring again to FIG. 1*a*, despite the fact that WID 30*a* is illustrated as being at a location that is within each of zones 20, 22 and 26 corresponding to machines M21, M2 and M4, respectively, clearly, WID 30*a* is closest to machine M4. With respect to the likelihood or probability that a WID user wants to obtain information related to any of machines M1, M2 or M4 based solely on location, it is most likely that the user of WID 30*a* will want to obtain information with respect to machine M4. Thus, in one embodiment, controller 38 may assign a relatively high probability to the machine M4 identifier and lower probabilities to the machine M1 identifier and machine M2 identifier. Thereafter, controller 38 may transmit information to WID 30*a* causing WID 30*a* to display the machine identifier list in a manner that reflects the probabilities.

Referring now to FIG. 12, an exemplary screen shot 180 including an instruction box 182 and a probability ordered machine list 184 is illustrated. Here, the instruction box 182 indicates that machine identifiers listed in list 184 are in a most likely preferred order and instructs the WID user to select one of the machine identifiers from the list 184. As illustrated, list 184 includes machine M4 first followed by machine M1 and then M2.

Probabilities may be assigned to machine identifiers based on other than simply assumed WID location. For example, particular WID users may routinely seek access to information corresponding to certain types of machines and only rarely seek access to information corresponding to other machine types. In this case, machine identifiers corresponding to machine types that the WID user routinely seeks access to may be assigned a relatively high probability. As another example, WID users may set preferences in a specification like specification 39 in FIG. 3 that indicate a preferred machine type order which could be used to set probabilities. As another example, recent historical machine access patterns may be used to set probabilities. For instance, if a particular WID user has accessed the same machine type the last 10 times a machine selection process has been performed, controller 38 may be programmed to recognize this pattern of selection and modify probabilities during a next consecutive selection process based thereon. Other probability factors are contemplated and it is also contemplated that combinations of probability factors may also be used to derive more complex weighted probability algorithms.

Figure 13:
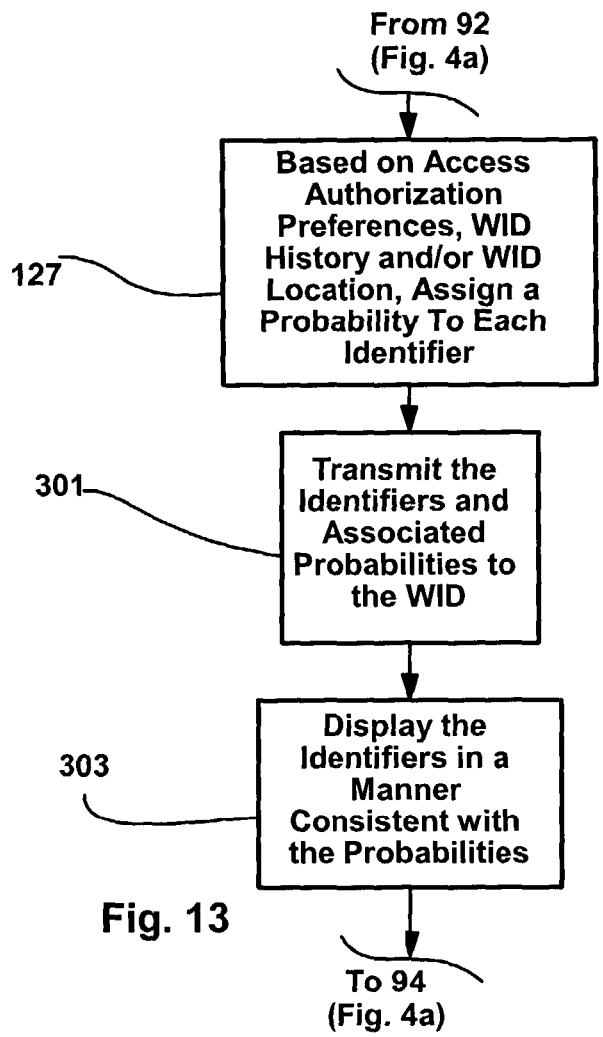
FIG. 13 is a sub-process corresponding to another of the portions of FIG. 4b.

Referring now to FIG. 13, a probability assigning sub-process according to the present invention is illustrated that may replace blocks 87 and 89 of FIG. 4a. Referring also to FIG. 4a, after a machine identifier sub-set has been identified at block 92, control passes on to the sub-process of FIG. 13. In FIG. 13, control first passes to block 127 where, based on access authorization preferences, WID history, WID location, and any other probability factors, controller 38 assigns a probability to each identifier in the identifier sub-set. Next, at block 301, controller 38 transmits the identifiers and associated probabilities to WID 30a and at block 303, WID 30a displays the identifiers in a manner that is consistent with the probabilities. After block 303, control again passes to block 94 in FIG. 4a where WID 30a monitors its input components to determine when an identifier selection has been made.

Figure 14:
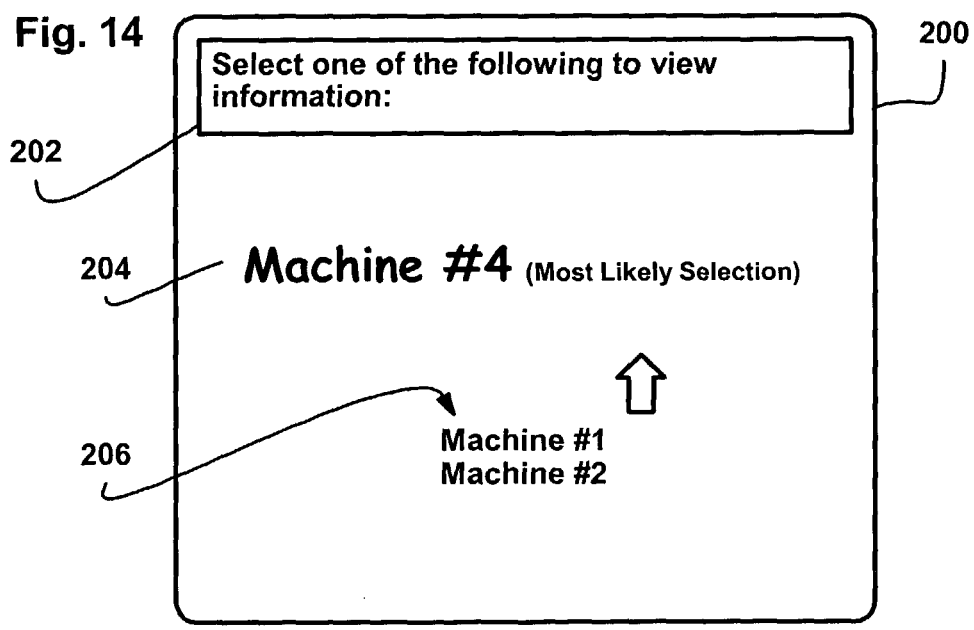
FIG. 14 is similar to FIG. 8, albeit illustrating another aspect of the present invention.

While machine identifier probabilities may be expressed to a WID user by simply shuffling the machine identifier list as illustrated in FIG. 13, other ways of expressing the probabilities are contemplated. To this end, referring to FIG. 14, another exemplary screen shot 200 that expresses identifier probabilities is illustrated. Screen shot 200 includes an instruction box 202, a highlighted most likely machine identifier 204 and a list of less likely or less probable machine identifiers 206. Most likely identifier 204 is illustrated as being a different font than other identifiers in list 206, a different size font, earmarked with a specific indication "most likely selection", may be provided in a different color font, may blink, and so on. Here, the identifiers in list 206 are arranged according to their relative probabilities.

While the embodiment described with respect to FIG. 4a calls for WID 30a to transmit signals to access points 11 and controller 38 identifies WID 30a location, it is contemplated that a reverse process may be performed to identify WID location. To this end, controller 38 may cause each of access points 11 to periodically transmit signals from indicating access point identifiers to WID 30a and WID 30a then determines WID location within facility 10 as a function of known information about the layout of access points 11. A process 248 consistent with this alternate is illustrated in FIG. 15.

Figure 15:
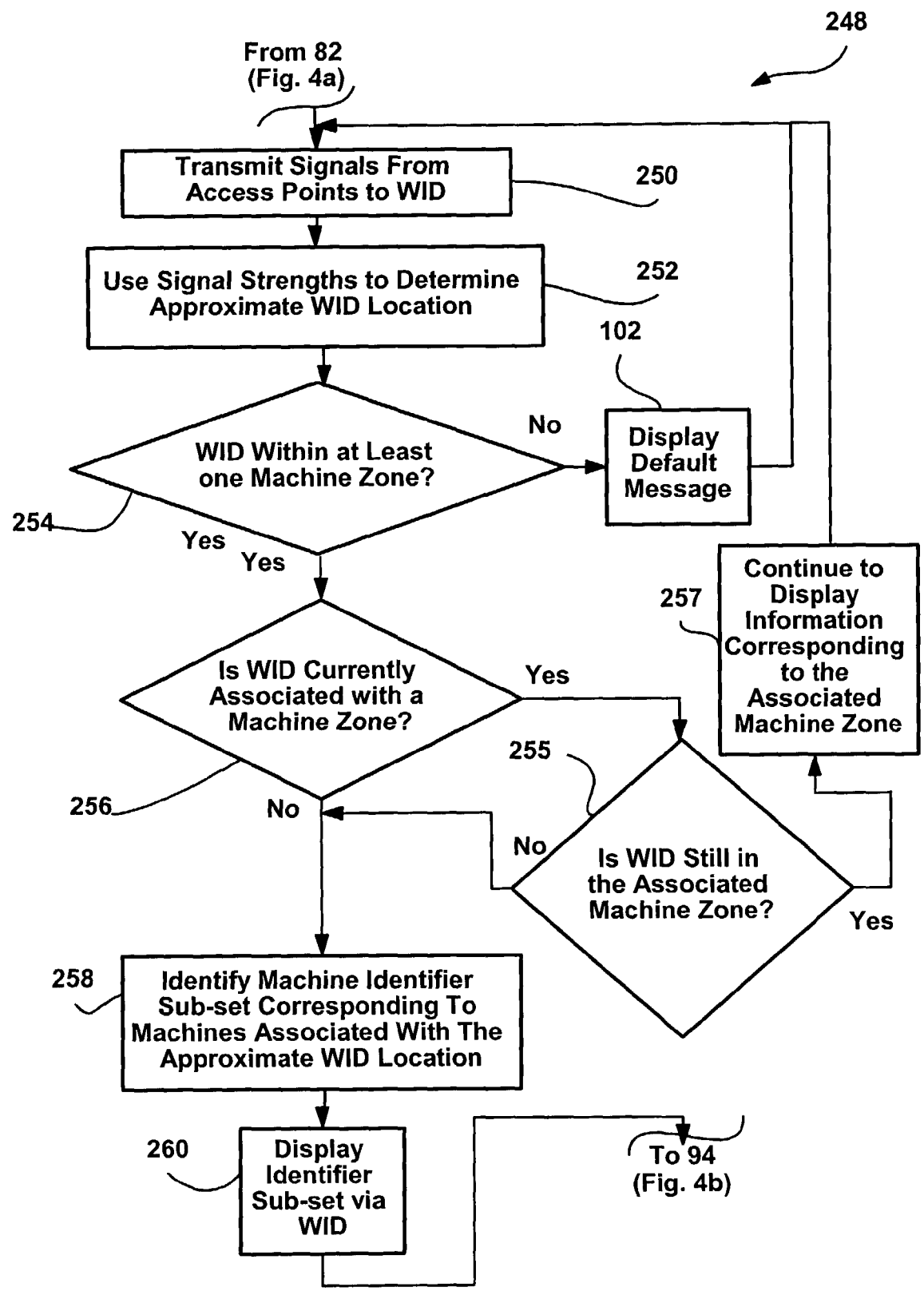
FIG. 15 is similar to FIG. 5, albeit illustrating a different detail of the display default message process block.

Referring now to FIGS. 1-3, 4a and also to FIG. 15, after block 82 in FIG. 4a where zones and identifiers corresponding to each of the facility machines M1-M11 have been identified, an electronic facility map consistent therewith is stored in the WID memory 69 (see again FIG. 2b). Thereafter, control passes to block 250 where controller 38 causes access points 11 to transmit access point identifier signals of a specific and known strength to WID 30a. At block 252, WID 30a uses the received signals to approximate WID location and also to determine the machine zone in which the WID is located. At block 254, WID 30a determines whether or not the WID is within a machine zone. Where the WID is not within a machine zone control passes to block 102 where the WID displays a default message. The default message may take any of several different forms and, in at least one embodiment, would take the form described above with respect to block 102 in FIG. 4a (see FIG. 1 in this regard). After block 102 control passes to block 250.

Referring again to block 254, where WID 30a is within a machine zone, control passes to block 256 where the WID processor determines whether or not the WID is currently associated with a machine zone. Where the WID is currently associated with a machine zone control passes to block 255 where the WID determines whether or not the WID is still in the associated machine zone. Where the WID is still in the associated machine zone, control passes to block 257 where the WID displays the information sub-set corresponding to the associated zone.

Referring again to block 256, where WID 30a is not currently associated with a machine zone, control passes to block 258 where WID 30a identifies the machine identifiers proximate the WID location and at block 260 WID 30a displays the machine identifier selection list. Referring again to block 255, where the WID is not in the associated machine zone, control passes to block 258.

Figure 16:
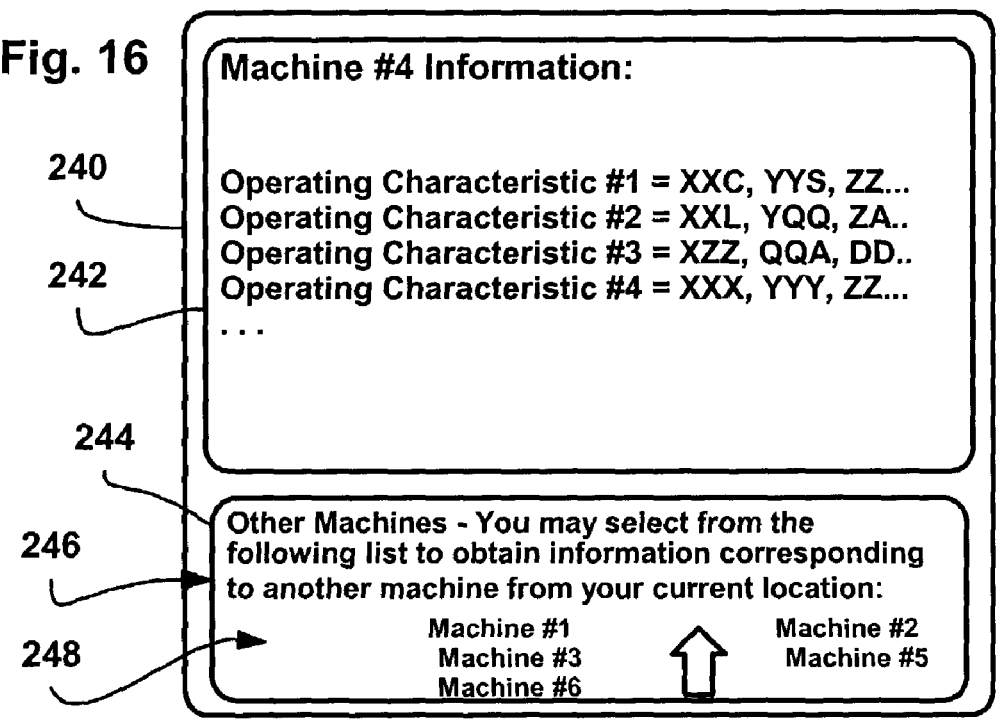
FIG. 16 is similar to FIG. 8, albeit illustrating one other screen shot according to another aspect of the present invention.

According to yet another aspect of some embodiments of the present invention, where probabilities are assigned to each of the machine identifiers corresponding to machines proximate a WID location to indicate likelihood that a WID user at the WID location will seek information corresponding to the particular machines, in addition to providing the machine identifier selections in a manner which reflects the probabilities assigned, machine information corresponding to the highest probability identifier may automatically be provided to the WID user. This aspect of the present invention should streamline the information accessing process appreciably as, for example, in many applications, it will be likely that the WID user will select the highest probability machine identifier a majority of the time. FIG. 16 illustrates an exemplary screen shot 240 that automatically provides information corresponding to the highest probability machine identifier and also provides a selection list indicating other machine identifiers corresponding to machines proximate a WID user's assumed location. Screen shot 240 includes a machine information window 242 and a selection window 244. Within machine information window 242 operating characteristics or any other suitable machine information corresponding to the most probable machine identifier is provided. In window 244, selection instructions 246 are provided along with a probability ordered machine identifier list 248. Here, when screen shot 240 is presented via the WID 30a, the user may simply observe the information within window 242 and perform whatever tasks are necessary while ignoring the information in window 244. In the alternative, if the WID user wishes to obtain information corresponding to one of the less probable machine identifiers, the WID user may select one of the other identifiers in a manner described above to obtain information related thereto.

Referring now to FIG. 17, a sub-process whereby machine information corresponding to a highest probability identifier is identified and then displayed automatically as described above is illustrated. Referring also to FIG. 4a, the sub-process of FIG. 17 is meant to replace process blocks 87 and 89. After a machine identifier sub-set has been identified at block 92 in FIG. 4a, control passes to block 305 in FIG. 17 where, based on whatever criteria has been set for assigning probabilities to identifiers, probabilities are assigned to each of the identifiers in the machine sub-set. Next, at block 307, controller 38 accesses the highest probability information sub-set related to the highest probability identifier. Continuing, at block 309 controller 38 transmits the identifiers, associated probabilities and highest probability information to the WID 30a.

At block 311 WID 30a displays the highest probability identifier and associated highest probability information as well as the lower probability identifier list in a manner similar to that illustrated in FIG. 16. Thereafter control again passes to block 94 in FIG. 4a where WID 30a monitors for selection.

In this case, according to one method, as the WID user moves about the facility, if the probabilities are location dependent, controller 38 will continue to track WID 30a position and automatically alter the information displayed in machine information box 242 to reflect the most probable information sought. In addition, list 248 may be reshuffled or updated to reflect varying location based probabilities.

According to one other aspect of the invention, upon identifying identifiers associated with a specific WID location, controller 38 may access machine information sub-sets for each identifier and transmit the machine information sub-sets for all of the machines to the WID 30a along with associated identifiers. Thereafter, WID 30a may provide the identifier selection list while storing the information sub-sets or may provide a screen shot similar to FIG. 16 to automatically provide the most likely sought information sub-set along with less probable machine identifiers for selection. Where an identifier is selected, as above, WID 30a provides the associated information sub-set from its own memory.

An exemplary sub-method consistent with this WID information storing aspect of the invention is illustrated in FIG. 18 where the looping process between blocks 90 and 84 may be replaced by the process of FIG. 18. At block 320 controller 38 assigns probabilities to identifiers. At block 322, controller 38 accesses sub-sets of information corresponding to the identified identifiers. At block 324 the identifiers, probabilities and information sub-sets are transmitted to WID 30a. At block 324, WID 30a stores the information sub-sets corresponding to other than the highest probability identifier in the WID memory along with correlated identifiers. At block 328, WID 30a displays the highest probability identifier along with the highest probability information as well as the lower probability identify list (see again FIG. 16). At block 330 WID 30a waits for an identifier selection, where no identifier is received, control loops back to block 328. Where one of the identifiers in the lower probability list is selected at block 330, control passes to block 332 where WID 30a accesses the sub-set of information corresponding to the selected identifier from memory and to block 336 where WID 30a displays the accessed sub-set. Next control passes back to block 84 in FIG. 4a.

Referring now to FIG. 19, a more detailed process corresponding to process block 96 in FIG. 4b is illustrated. Referring also to FIG. 4b, after a selected identifier has been transmitted from WID 30a to controller 38 via the access points, control passes to block 210 where controller 38 accesses the authorization/preferences specification 39 (see again FIG. 3) stored in database 40. Continuing, at block 212, controller 38 access the machine information sub-set corresponding to the selected machine identifier and the authorization/preferences specification. After block 212, control passes back to block 98 in FIG. 4b where the accessed information is transmitted to the WID for display. Thus, the simple process of FIG. 19 facilitates customization of accessed information and also can be used to enforce authorization limitations related to accessed information.

Thus, in some embodiments of the invention controller 38 employs the authorization/preferences specification 39 (see again FIG. 3) at least twice during a process cycle. First, controller 38 may use specification 39 to widdle down the identifier selection list to only identifiers corresponding to machines that a particular WID user can or wants to obtain information for. Second, controller 38 uses specification 39 to customize the machine information provided to a WID user after an identifier has been selected.

As indicated above, where control information is to be accessed, according to one aspect of several embodiments of the invention, an affirmative step is required whereby a WID user affirmatively elects to receive control information and to configure the user's WID 30a to facilitate machine control. This affirming step is particularly important in cases where the WID locating system is not particularly accurate as, for example, illustrated in FIGS. 1b and 1c.

Figure 22:
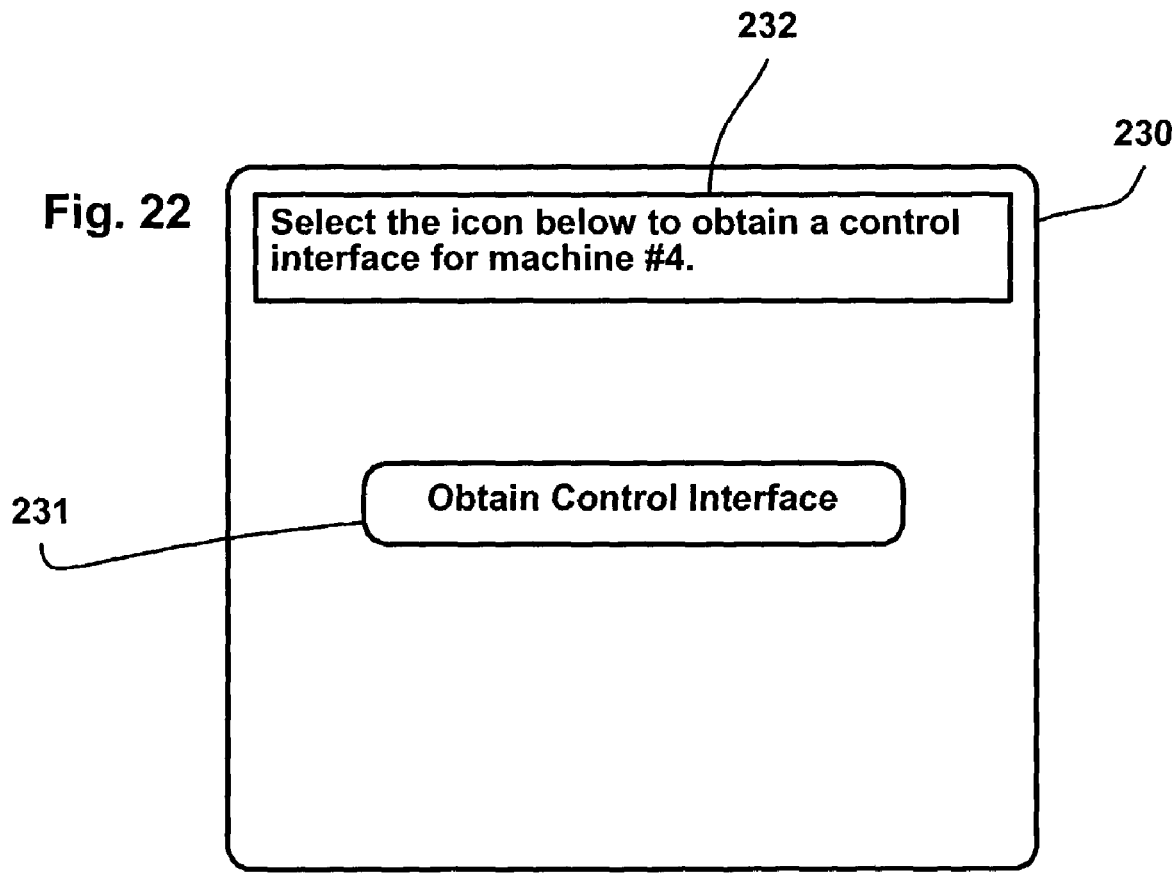
FIG. 22 is similar to FIG. 8, albeit of another screen shot according to a different aspect of the present invention.

One exemplary affirming sub-process which may be provided as an enhancement to the process of FIG. 4b is illustrated in FIG. 24. Referring also to FIG. 4b, after machine information corresponding to a selected machine identifier has been accessed at block 96, control passes to block 220 where processor 38 determines whether or not the accessed information is control information or simply access/or monitoring information. Where the access information is not control information at block 220, control passes to block 98 in FIG. 4b where the access type information is transmitted to the WID for display. However, referring again to block 220, where the information is control information, control passes to block 222 where controller 38 performs some process to require an affirmative control request from the WID user. For instance, in this regard, controller 38 may transmit a message to WID 30a for display to the WID user specifically requesting that the user elect control information. An exemplary screen shot 230 including an instruction box 232 and an affirming icon 231 is illustrated in FIG. 21. Continuing, at block 224, the WID 30a waits for reception of an affirmative control request wherein, for instance, the WID user may select the affirming icon 231 in FIG. 22. Where no affirmative control request is received, in the embodiment of FIG. 21, control passes back up to block 222 where WID 30a continues to display a screen shot similar to screen shot 230. After an affirmative control request has been received at block 224, control passes to block 98 in FIG. 4b where the control information is transmitted to the WID 30a for display.

Figure 23:
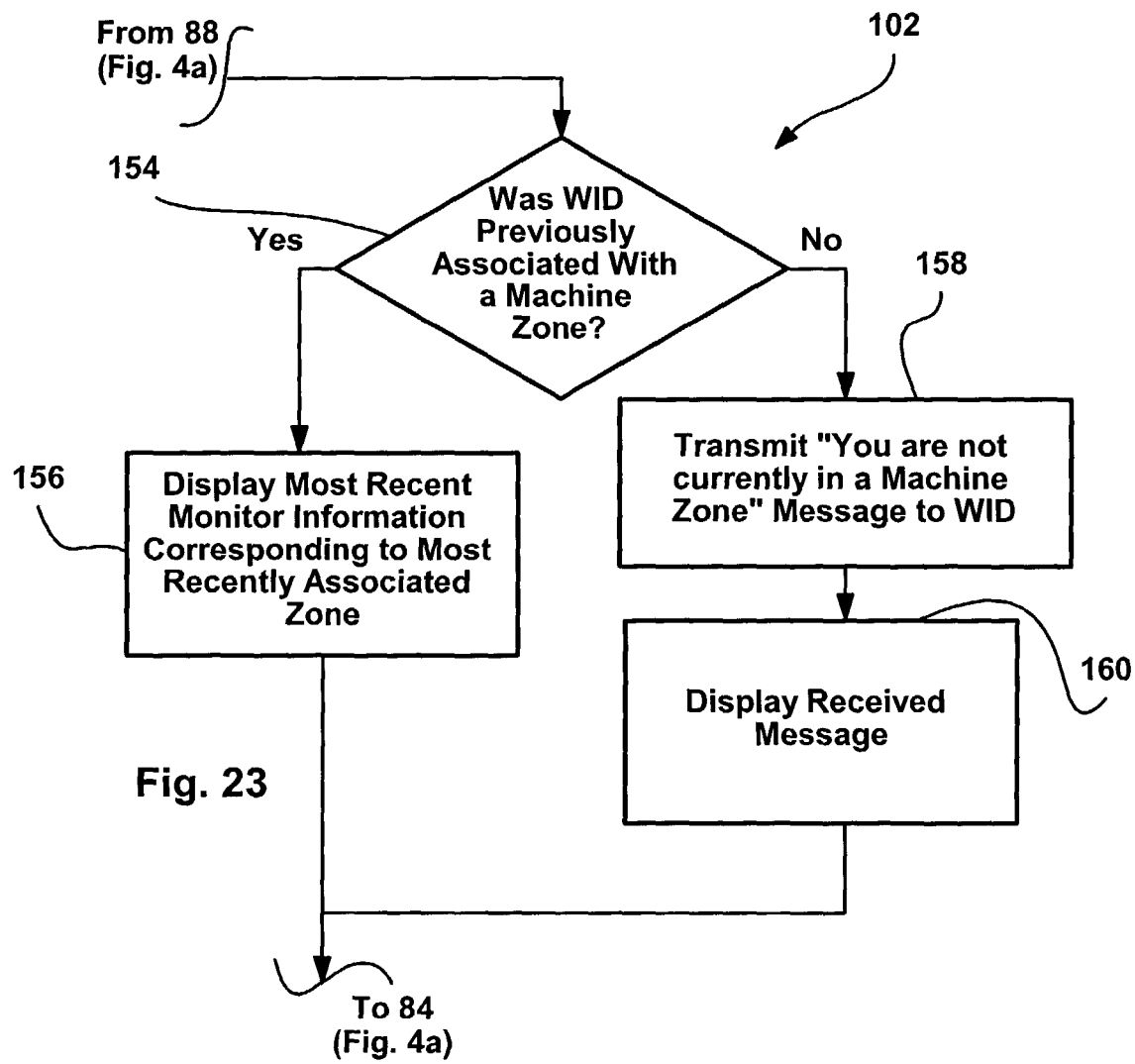
FIG. 23 is similar to FIG. 22, albeit illustrating one other aspect of the present invention.

Referring-again to FIG. 4a and also to FIG. 23, an alternate default message process 102 is illustrated in FIG. 23. Referring also to FIGS. 1a and 2a, in FIG. 23, at block 154, controller 38 determines whether the WID 30a was previously associated with a machine zone. Here, for instance, between consecutive process 80 cycles in FIG. 4a, a WID 30a may have been moved from within a machine zone (e.g., 26 in FIG. 1a) into another location that is not associated with a particular machine. Where the WID was previously associated with a machine zone, control passes to block 156 where controller 38 allows the WID to display the most recent monitor information corresponding to the most recently associated zone. Thus, for instance, again referring to FIG. 1a, where WID 30a is moved from within zone 26 into an unassociated location between consecutive process 80 cycles, the process illustrated in FIG. 23 causes WID 30a to continue to display the most recently displayed monitor information corresponding to machine M4 while WID 30a remains in a region that is not within some other machine zone. Where the WID was not previously associated with a machine zone, control passes to block 158 where controller 38 transmits a message such as "You are not currently in a machine zone." to the WID 30a via proximate access points 11. At block 160 the WID 30a displays the received message. After each of blocks 156 and 160 control again passes to block 84 in FIG. 4a.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims. For example, while not described in detail above, it should be appreciated that, in at least some embodiments, real time data may be provided to an associated WID when system criteria are met so that, for instance, a WID user within a machine zone and having a WID that is associated with the machine may be able to observe automatically updated machine operating characteristics for the particular machine. In addition, while the present invention is described generally in the context of static machine information presentation, it should be appreciated that the invention is particularly advantageous where machine information is updated routinely. In this case, it is contemplated that, in at least one embodiment of the invention, the controller would update information presented to the WID user as the machine information is updated in the memory employed by the controller and while the WID remains associated with a particular machine (i.e., as above, when the WID is removed from a zone associated with a machine, the system may restrict the information provided via the WID).

To apprise the public of the scope of this invention, the following claims are made.

What is claimed is:

1. A method for identifying one of several different machines from within a facility for which information is to be presented via a wireless information device (WID), the method for use with a facility having a location identifying system capable of generally identifying WID location within the facility, the facility also including a wireless information system for transmitting information to a WID, a controller linked to the wireless information system and including a controller memory and a plurality of machines, machine information stored in the controller memory, the method comprising the steps of:

assigning machine identifiers to each facility machine;
determining WID location within the facility;
identifying machines to be associated with the WID:
presenting machine identifiers corresponding to at least two of the identified machines;
receiving a selection indication via the WID indicating one of the visually presented machine identifiers;
accessing machine information corresponding to the selected machine identifier; and
presenting the accessed machine information via the WID.

2. The method of claim 1 for use with a facility including machine zones, a separate machine zone associated with each of the machines and corresponding to a space within the facility where information associated with a corresponding machine is accessible via the wireless information system, the step of presenting machine identifiers including identifying at least two machine zones corresponding to WID location, identifying machine identifiers corresponding to the identified machine zones, transmitting the identified machine identifiers to the WID and presenting the transmitted machine identifiers via the WID.

3. The method of claim 1 wherein the WID also includes a transmitter and the step of accessing includes transmitting the machine identifier to the controller via the wireless information system, correlating the machine identifier with machine information for a specific machine stored in the controller memory, transmitting the machine information to the WID and storing the transmitted information in the WID.

4. The method of claim 1 wherein the WID includes a display and wherein the selection presenting step and machine information presenting step include displaying the selection and machine information, respectively.

5. The step of claim 2 wherein the step of identifying machines includes assigning a probability to each identified machine regarding likelihood that information corresponding to the identified machine is to be presented, the identifiers including a highest probability identifier corresponding to the machine for which machine information is most likely to be presented, the step of presenting the selection including presenting the highest probability identifier differently than the lower probability identifiers.

6. The step of claim 5 wherein the WID includes a display and the step of presenting includes displaying the highest probability identifier in a visually different manner than the lower probability identifiers.

7. The method of claim 6 wherein the step of displaying includes displaying the highest probability identifier in a larger font than the lower probability identifiers.

8. The method of claim 6 wherein the step of displaying includes displaying the highest probability identifier in a different font than the lower probability identifiers.

9. The method of claim 6 wherein the step of displaying includes displaying the highest probability identifier in a different color than the lower probability identifiers.

10. The method of claim 5 wherein probability assignment is based on WID location with respect to the machine zones.

11. The method of claim 5 wherein a WID identifier is associated with each WID and wherein the method further includes the step of identifying the WID identifier and assigning the probability based on the identified WID identifier.

12. The method of claim 11 wherein the step of identifying the WID identifier includes transmitting the WID identifier from the WID to the wireless information system and the step of assigning the probability includes correlating the WID identifier with a WID specification indicating a likely probability associated with machine types.

13. The method of claim 5 further including the step of providing a machine type selection via the WID indicating at least a sub-set of the machine types within the facility, receiving a priority selection via the WID indicating a selected machine type and wherein, when the WID is in a zone corresponding to a machine of the selected machine type, the step of assigning includes assigning the highest probability to the machine of the selected machine type.

14. The method of claim 5 wherein the WID includes a display, the machine information corresponding to the machine associated with the highest probability zone is the probable information, the step of presenting machine identifiers includes accessing the probable information and transmitting the probable information to the WID and wherein the step of presenting includes displaying the probable information, displaying the highest probability identifier in a fashion that associates the highest probability identifier with the probable information and displaying the lower probability identifiers in a manner different than the highest probability identifier.

15. The step of claim 14 wherein the step of presenting includes displaying the highest probability identifier in a visually different manner than the lower probability identifiers.

16. The method of claim 15 wherein the highest probability identifier and probable information are displayed in a font that is different than the other identifiers.

17. The method of claim 15 wherein the step of displaying includes displaying the highest probability identifier in a different font than the lower probability identifiers.

18. The method of claim 15 wherein the step of displaying includes displaying the highest probability identifier in a different color than the lower probability identifiers.

19. The method of claim 1 wherein the step of presenting the information corresponding to the selected machine includes monitoring WID location and presenting the machine information until the WID is located outside a zone associated with the selected machine identifier.

20. The method of claim 2 wherein the step of presenting the information corresponding to the selected machine includes monitoring WID location and presenting the machine information until the WID is located outside a zone associated with the selected machine identifier.

21. The method of claim 20 wherein, for at least a sub-set of the machines, first and second zones are associated with each machine where the second zone is larger than the first zone and, wherein, the step of identifying machine zones includes identifying first machine zones and the step of presenting machine information until the WID is located outside a zone includes presenting machine information until the WID is located outside a second machine zone.

22. The method of claim 21 wherein at least a sub-set of the second machine zones includes first machine zones associated with the same machine.

23. The method of claim 21 wherein the step of presenting the machine information includes, when the WID is located outside the second zone, presenting a warning that the WID is outside a zone corresponding to the selected machine.

24. The method of claim 23 wherein the step of presenting the machine information includes, when the WID is located outside the second zone, presenting the machine information along with the warning.

25. The method of claim 2 further including the step of presenting a separate visual machine indicator physically associated with each facility machine where each machine indicator matches the machine identifier for the machine.

26. The method of claim 25 wherein the step of providing machine indicators includes providing visual indicators on each machine.

27. The step of claim 25 wherein the step of providing machine indicators includes providing visual indicators adjacent each machine.

28. The method of claim 1 wherein the step of accessing machine information includes accessing machine information for each of the presented identifiers, the step of transmitting includes transmitting machine information corresponding to each of the identifiers to the WID and storing the machine information in the WID and the step of presenting includes presenting the information associated with the selected machine identifier.

29. The method of claim 28 further including the step of, while presenting the information associated with the selected machine identifier, continuing to present the machine identifiers via the WID.

30. The method of claim 1 further including the step of, while presenting the information associated with the selected machine identifier, continuing to present the machine identifiers via the WID and monitoring the WID for another machine identifier selection and, when another machine identifier selection is received, accessing the information associated with the selected WID identifier, transmitting the machine information to the WID and presenting the machine information via the WID.

31. The method of claim 1 wherein the step of presenting machine identifiers corresponding to machines associated with the WID location includes physically associating a separate visual machine indicator with each facility machine.

32. The method of claim 31 further including the step of, after the step of receiving the selected machine identifier, determining if the WID is proximate the machine associated with the selected identifier and only presenting the machine information if the WID is proximate the machine associated with the selected identifier.

33. The method of claim 1 wherein the WID includes a transponder, the method further including the step of storing a WID identifier in the WID, the step of accessing machine information including transmitting the WID identifier to the controller via the wireless information system and selecting a sub-set of the machine information corresponding to the specific WID identifier.

34. The method of claim 33 wherein the step of transmitting the machine information includes transmitting the machine information along with the WID identifier thereby specifying the recipient WID to receive the transmitted machine information.

35. The method of claim 1 wherein a WID identifier is associated with each WID and wherein the method further includes the step of identifying the WID identifier, the step of visually presenting includes identifying a WID specification corresponding to the WID identifier that indicates information to be provided via the WID and presenting the machine identifiers in a manner consistent with the WID specification.

36. The method of claim 35 wherein the WID specification indicates a sub-set of machine information for at least a sub-set of the facility machines and wherein the step of visually presenting includes presenting only the sub-set of information indicated by the WID specification.

37. The method of claim 36 wherein, for at least a first WID, the WID specification indicates only machine monitoring information and for at least a second WID, the specification indicates both monitoring and control information.

38. The method of claim 1 wherein the machine information changes and wherein the step of presenting includes updating the presented information while the WID remains proximate a machine associated with the selected identifier.

39. The method of claim 38 wherein the step of updating includes monitoring WID location and, when the WID is no longer proximate the machine associated with the selected identifier, halting information updating.

40. A method for identifying one of several different machines from within a facility for which information is to be presented via a wireless information device (WID), the method for use with a facility having a location identifying system capable of generally identifying WID location within the facility, the facility also including a wireless information system for transmitting information to a WID, a controller linked to the wireless information system and including a controller memory and a plurality of machines, machine information stored in the controller memory, the method comprising the steps of:

assigning machine identifiers to each facility machine;

assigning machine zones to at least a sub-set of the machines within the facility where each machine zone corresponds to a space within the facility in which it is suitable for a WID user to access information for an associated machine;

storing the WID identifiers and correlated machine zones in the controller memory;

determining WID location within the facility;

accessing the machine zones within the controller memory and identifying if the WID is within at least one machine zone;

where the WID is within at least one machine zone, identifying an identifier sub-set including machine identifiers associated with each zone in which the WID currently resides;

transmitting the identifier sub-set to the WID; and presenting the identifier sub-set to the WID user.

41. The method of claim 40 further including the steps of, after the identifier sub-set is presented, receiving a selection indication via the WID indicating one of the identifier sub-set identifiers, accessing machine information corresponding to the selected machine identifier and presenting the accessed machine information via the WID.

42. The method of claim 41 wherein the WID also includes a transmitter and the step of accessing includes transmitting the machine identifier to the controller via the wireless information system, correlating the machine identifier with machine information for a specific machine stored in the controller memory, transmitting the machine information to the WID and storing the transmitted information in the WID.

43. The method of claim 42 wherein the WID includes a display and wherein the selection presenting step and machine information presenting step include displaying the selection and machine information, respectively.

44. The step of claim 40 wherein the step of identifying the identifier sub-set includes assigning a probability to each sub-set identifier regarding likelihood that information corresponding to the identifier is to be presented, the identifiers including a highest probability identifier corresponding to the machine for which machine information is most likely to be presented, the step of presenting the selection including presenting the highest probability identifier differently than the lower probability identifiers.

45. The step of claim 44 wherein the WID includes a display and the step of presenting includes displaying the highest probability identifier in a visually different manner than the lower probability identifiers.

46. The method of claim 45 wherein the step of displaying includes displaying the highest probability identifier in at least one of a larger font than the lower probability identifiers, in a different font than the lower probability identifiers and in a different color than the lower probability identifiers.

47. The method of claim 44 wherein probability assignment is based on WID location with respect to the machine zones.

48. The method of claim 44 wherein a WID identifier is associated with each WID and wherein the method further includes the step of identifying the WID identifier and assigning the probability based on the identified WID identifier.

49. The method of claim 48 wherein the step of identifying the WID identifier includes transmitting the WID identifier from the WID to the wireless information system and the step of assigning the probability includes correlating the WID identifier with a WID specification indicating a likely probability associated with machine types.

50. The method of claim 44 wherein the WID includes a display, the machine information corresponding to the machine associated with the highest probability zone is the probable information, the step of presenting machine identifiers includes accessing the probable information and transmitting the probable information to the WID and wherein the step of presenting includes displaying the probable information, displaying the highest probability identifier in a fashion that associates the highest probability identifier with the probable information and displaying the lower probability identifiers in a manner different than the highest probability identifier.

51. The method of claim 41 wherein the step of presenting the information corresponding to the selected machine includes monitoring WID location and presenting the machine information until the WID is located outside a zone associated with the selected machine identifier.

52. The method of claim 51 wherein, for at least a sub-set of the machines, first and second zones are associated with each machine where the second zone is larger than the first zone and, wherein, the step of identifying machine zones includes identifying first machine zones and the step of presenting machine information until the WID is located outside a zone includes presenting machine information until the WID is located outside a second machine zone.

53. The method of claim 52 wherein at least a sub-set of the second machine zones includes first machine zones associated with the same machine.

54. The method of claim 51 wherein the step of presenting the machine information includes, when the WID is located outside the second zone, presenting a warning that the WID is outside a zone corresponding to the selected machine.

55. The method of claim 40 wherein the step of presenting the sub-set to the user further includes the steps of monitoring WID location and updating the presented machine identifier sub-set as WID location is altered.

56. A method for identifying one of several different machines from within a facility for which information is to be presented via a wireless information device (WID), the method for use with a facility having a location identifying system capable of generally identifying WID location within the facility, the facility also including a wireless information system for transmitting information to a WID, a controller linked to the wireless information system and including a controller memory and a plurality of machines, machine information stored in the controller memory, the method comprising the steps of:

determining WID location within the facility;
identifying a sub-set of the facility machines proximate the WID location; and
presenting the machine sub-set via the WID.

57. The method of claim 56 further including the steps of receiving a selection indication via the WID indicating one of the presented machines, accessing machine information corresponding to the selected machine and presenting the accessed machine information via the WID.

58. The method of claim 56 for use with a facility including machine zones, a separate machine zone associated with each of the machines and corresponding to a space within the facility where information associated with a corresponding machine is accessible via the wireless information system, the step of presenting machines including identifying at least two machine zones corresponding to WID location, identifying machines corresponding to the identified machine zones, transmitting identified machine identifiers to the WID and presenting the transmitted machine identifiers via the WID.

59. The method of claim 56 wherein the WID includes a display and wherein the selection presenting step and machine information presenting step include displaying the selection and machine information, respectively.

60. The step of claim 56 wherein the step of identifying machines includes assigning a probability to each identified machine regarding likelihood that information corresponding to the identified machine is to be presented, the machines identified including a highest probability machine corresponding to the machine for which machine information is most likely to be presented, the step of presenting the selection including presenting a highest probability machine identifier differently than the lower probability machine identifiers.

61. The step of claim 60 wherein the WID includes a display and the step of presenting includes displaying the highest probability identifier in a visually different manner than the lower probability identifiers.

62. The method of claim 60 wherein probability assignment is based on WID location with respect to the machine zones.

63. The method of claim 60 wherein a WID identifier is associated with each WID and wherein the method further includes the step of identifying the WID identifier and assigning the probability at least in part based on the identified WID identifier.

64. A method for identifying one of several different machines from within a facility for which information is to be presented via a wireless information device (WID), the method for use with a facility having a location identifying system capable of generally identifying WID location within the facility, the facility also including a wireless information system for transmitting information to a WID, a controller linked to the wireless information system and including a controller memory and a plurality of machines, machine information stored in the controller memory, the method comprising the steps of:
  a) assigning machine identifiers to each facility machine;
  b) determining WID location within the facility;
  c) generating a machine identifier sub-set of machine identifiers corresponding to machines associated with the WID location;
  d) presenting a machine identifier sub-set to the WID user;
  e) repeating steps b through d to update the presented identifier sub-set as a function of WID location.

65. The method of claim 64 further including the step of receiving a selection indication via the WID indicating one of the visually presented machine identifiers.

66. The method of claim 65 further including the step of accessing machine information corresponding to the selected machine identifier.

67. The method of claim 66 further including the step of presenting the accessed machine information via the WID.

68. The method of claim 67 further including the step of, after presenting the accessed machine information, repeating steps b through d to update the presented identifier sub-set.

69. The method of claim 65 wherein the WID includes a transceiver and the step of accessing includes transmitting the selected identifier to the controller via the wireless information system, correlating the selected identifier with information for the associated machine and then transmitting the correlated information to the WID via the information system.

* * * * *